(12) United States Patent
Genesius et al.

(10) Patent No.: US 11,274,710 B2
(45) Date of Patent: Mar. 15, 2022

(54) DISC PACK COUPLING

(71) Applicants: KACO GmbH + Co. KG, Kirchardt (DE); Miba Frictec GmbH, Laakirchen (AT); Muhr und Bender KG, Attendorn (DE)

(72) Inventors: Andreas Genesius, Heilbronn (DE); Marcus Teller, Heilbronn (DE); Wilhelm Wunder, Ilsfeld (DE); Martin Eisele, Karlsruhe (DE); Johannes Kern, Blankenloch (DE); Sascha Ott, Bad Herrenalb (DE); Tobias Stürmlinger, Karlsruhe (DE); Falk Nickel, Gmunden (AT); David Pühringer, Laakirchen (AT); Hüseyin Gürbüz, Herborn (DE); Sven Roth, Weitefeld (DE); Jörgen Schulz, Hachenburg (DE)

(73) Assignees: KACO GMBH + CO. KG, Kirchardt (DE); MIBA FRICTEC GMBH, Laakirchen (AT); MUHR UND BENDER KG, Attendorn (DE)

(*) Notice: Subject to any disclaimer, the term of this patent is extended or adjusted under 35 U.S.C. 154(b) by 0 days.

(21) Appl. No.: 16/827,733

(22) Filed: Mar. 24, 2020

(65) Prior Publication Data
US 2020/0309201 A1  Oct. 1, 2020

(30) Foreign Application Priority Data

Mar. 25, 2019 (DE) .................... 10 2019 002 212.2

(51) Int. Cl.
*F16D 13/75* (2006.01)
*F16D 23/12* (2006.01)
(Continued)

(52) U.S. Cl.
CPC ............ *F16D 13/75* (2013.01); *F16D 13/52* (2013.01); *F16D 23/12* (2013.01); *F16D 25/08* (2013.01); *F16D 2023/123* (2013.01)

(58) Field of Classification Search
CPC .......... F16D 13/52; F16D 13/75; F16D 23/12
See application file for complete search history.

(56) References Cited

U.S. PATENT DOCUMENTS 10,094,427 B2 * 10/2018 Littlefield ............... F16D 11/14
2015/0267761 A1 * 9/2015 Yoshimura ............. F16D 13/70
                                                            180/249
(Continued)

*Primary Examiner* — Stacey A Fluhart
(74) *Attorney, Agent, or Firm* — Gudrun E. Huckett

(57) ABSTRACT

A disc pack coupling for torque transmission between shafts has coupling discs. A locking unit is provided that maintains a contact pressure acting on the coupling discs when the disc pack coupling is closed. The locking unit has a locking part, a guide part, an actuating element, and a pressure element. The guide part is non-rotatably and non-displaceably arranged in relation to a first shaft. The locking part has a locking part axis and is rotatable about and displaceable axially relative to the locking part axis. Locking part and guide part are provided with interacting control surfaces positioned at a slant to a rotational direction of the locking part. The control surfaces are provided to move the locking part into a first and a second stop position. In the first stop position, the locking part maintains the contact pressure on the coupling discs.

22 Claims, 37 Drawing Sheets

(51) Int. Cl.
*F16D 13/52* (2006.01)
*F16D 25/08* (2006.01)

(56) References Cited

U.S. PATENT DOCUMENTS

2016/0097430 A1* 4/2016 Imafuku .................. F16D 28/00
  192/18 B
2016/0363175 A1* 12/2016 Vierk ...................... F16D 13/52

* cited by examiner

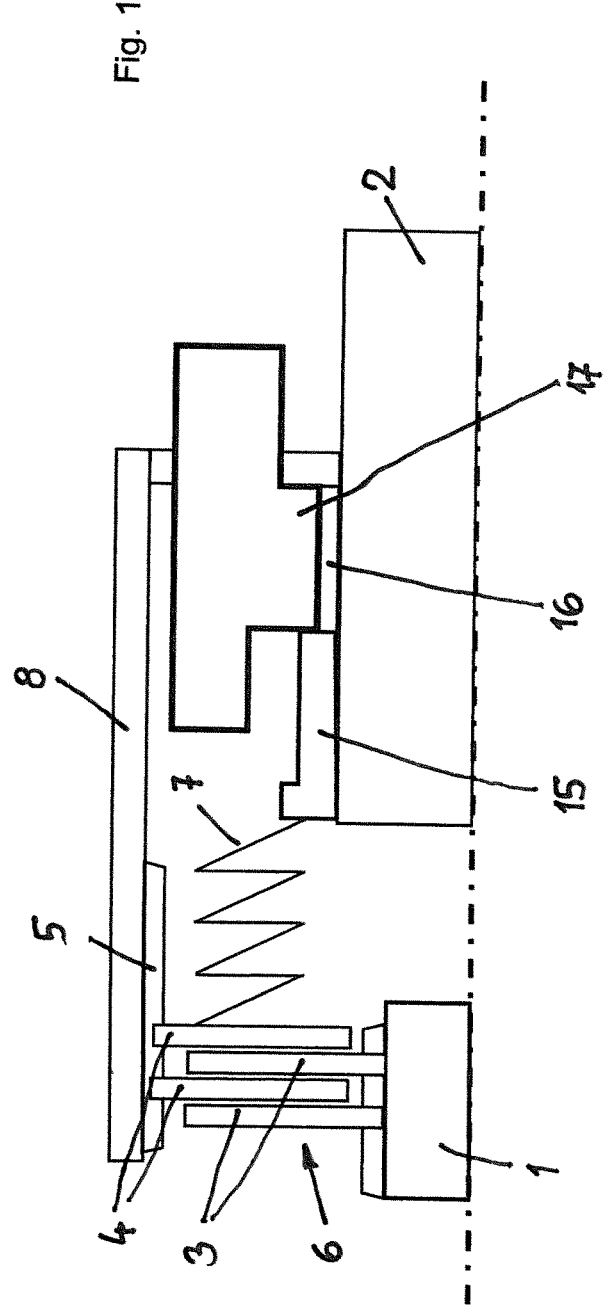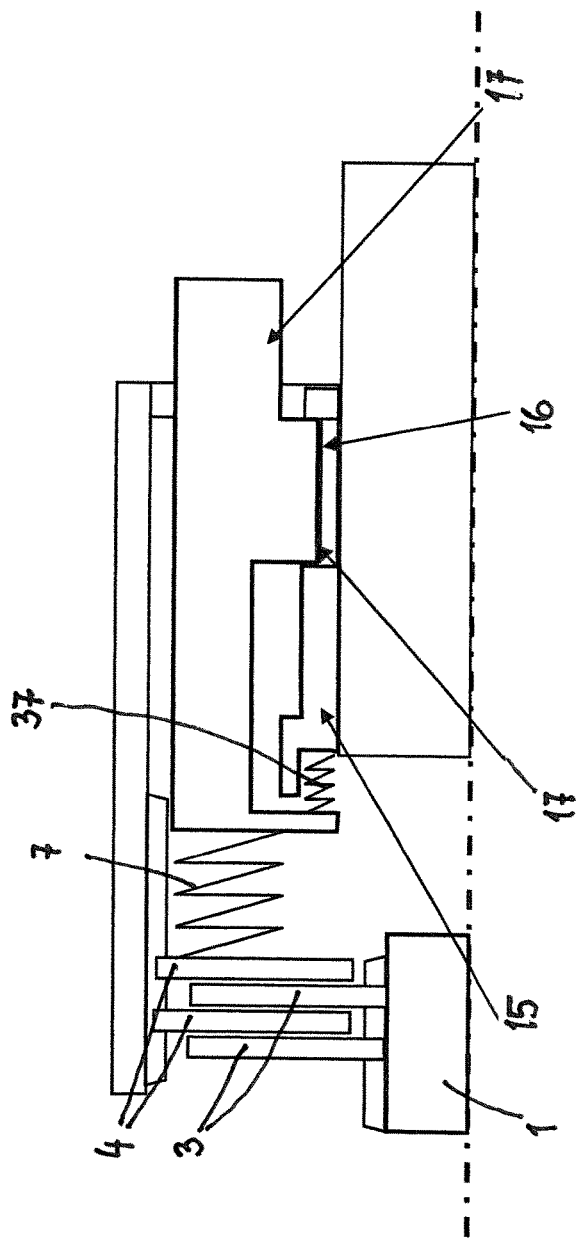

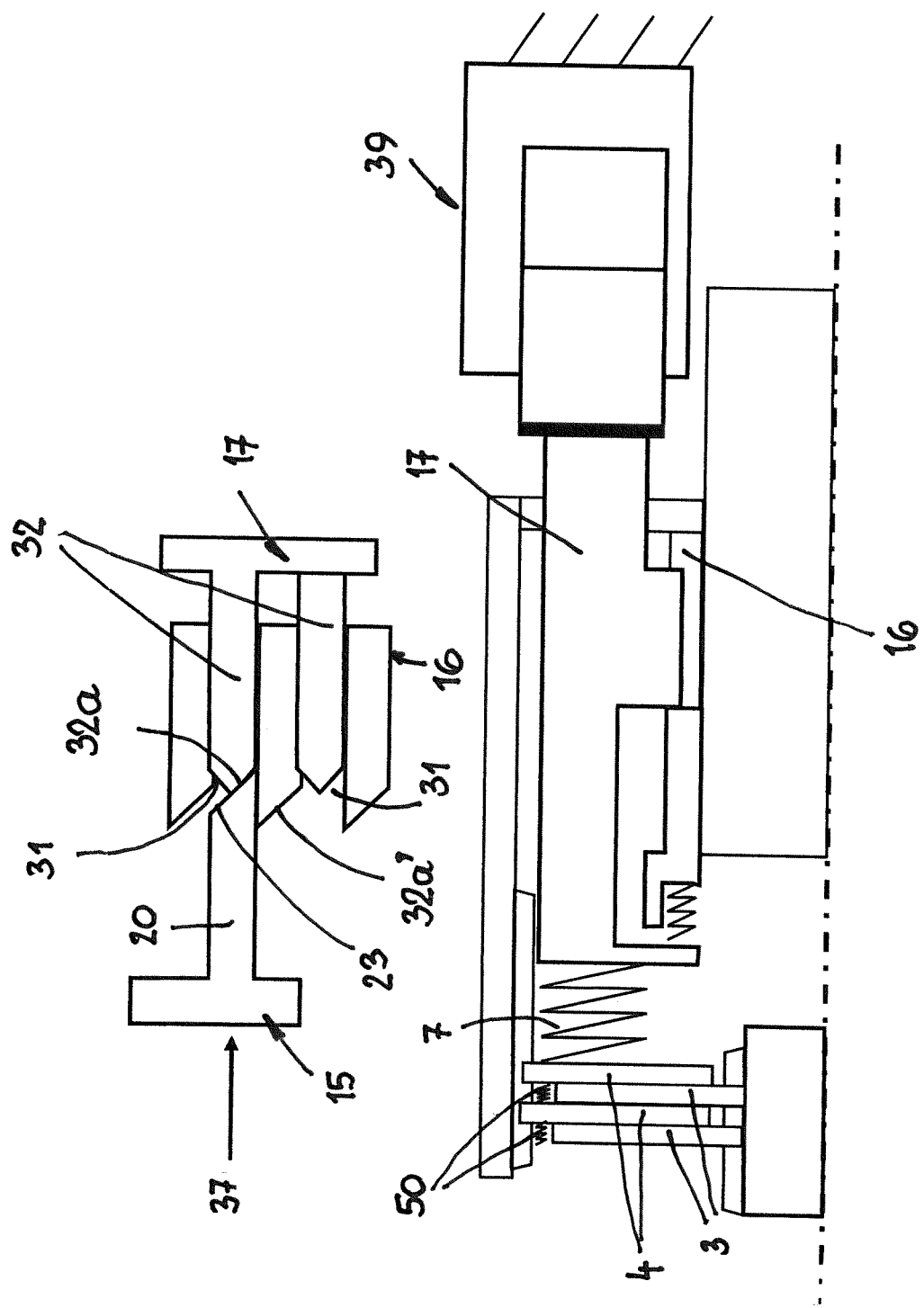

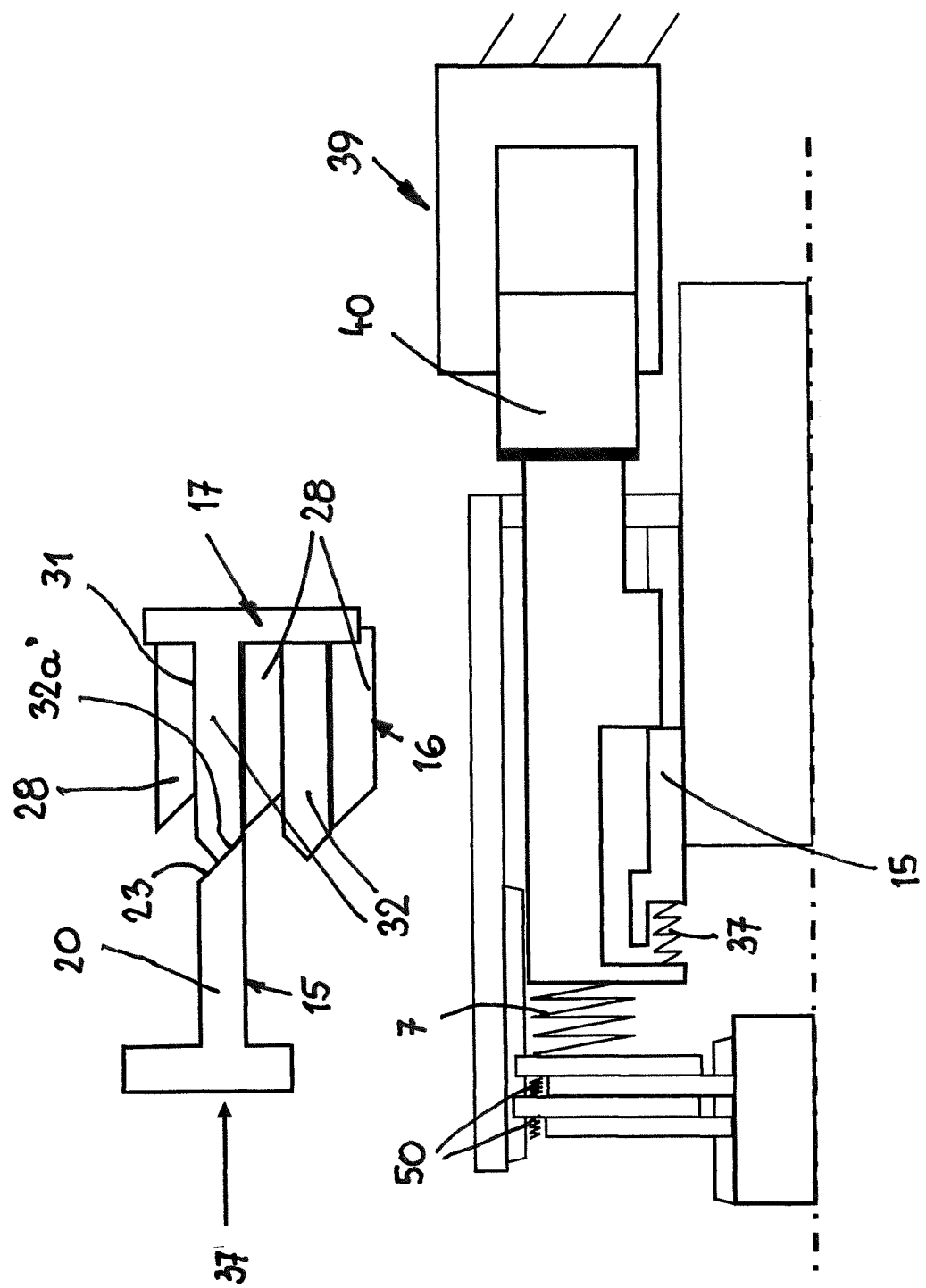

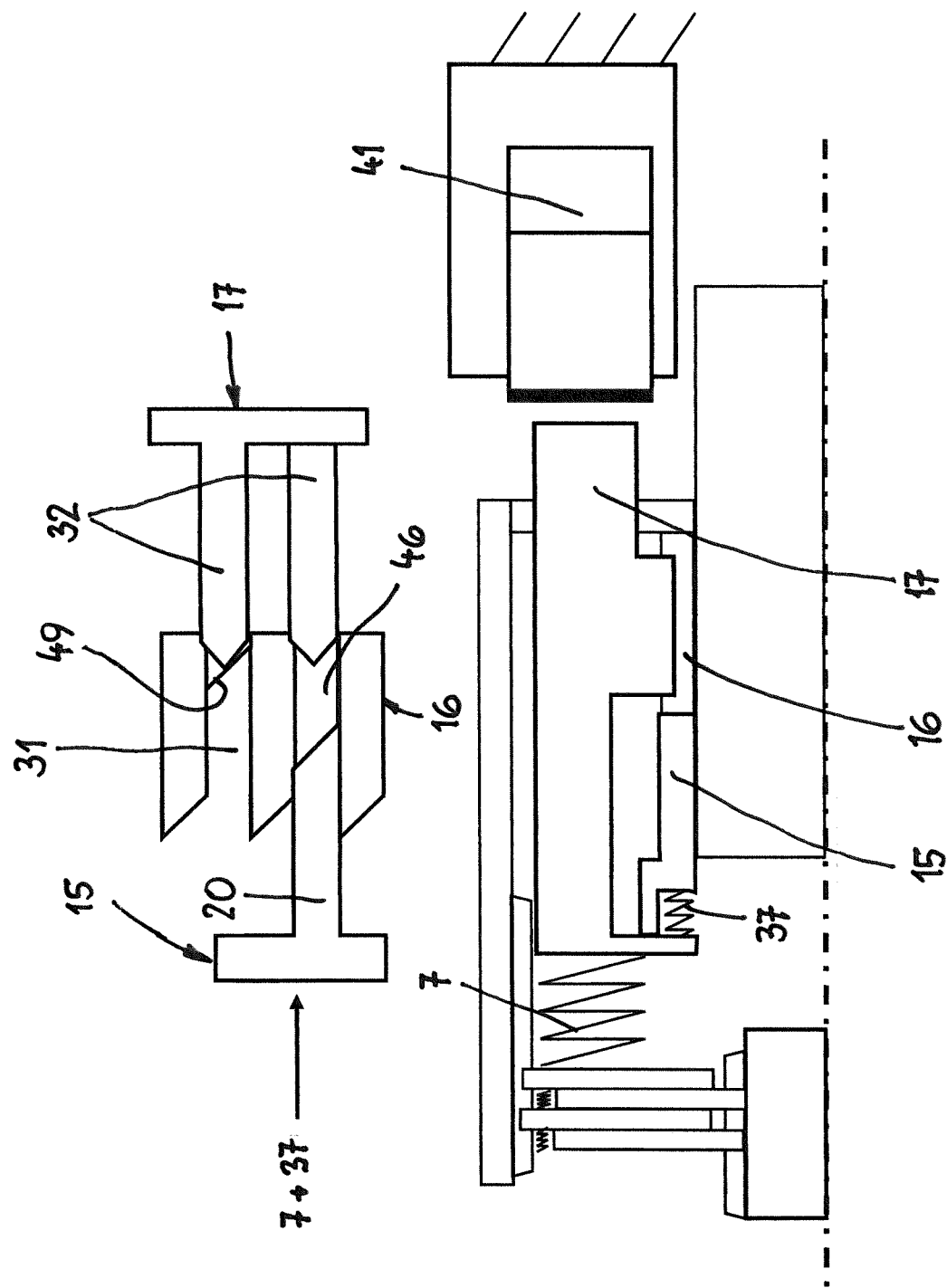

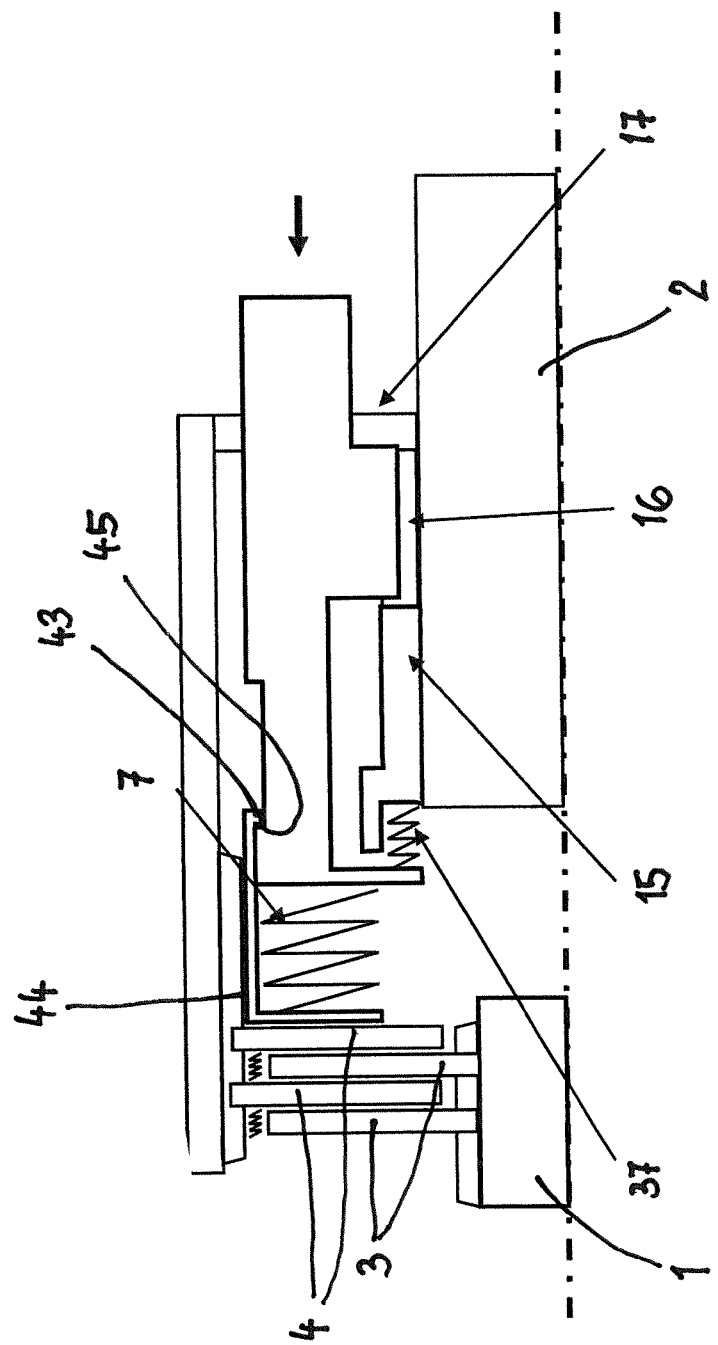

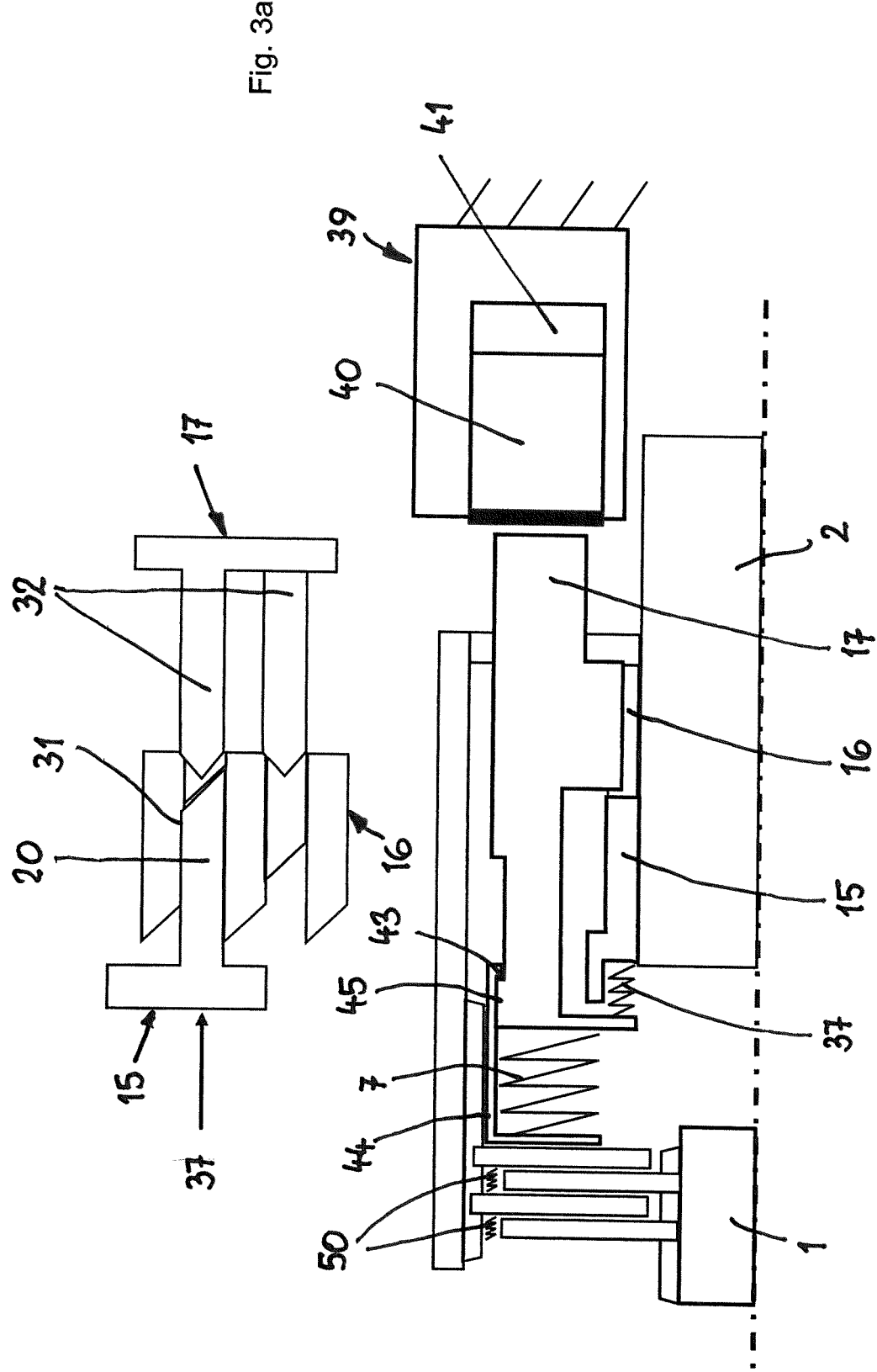

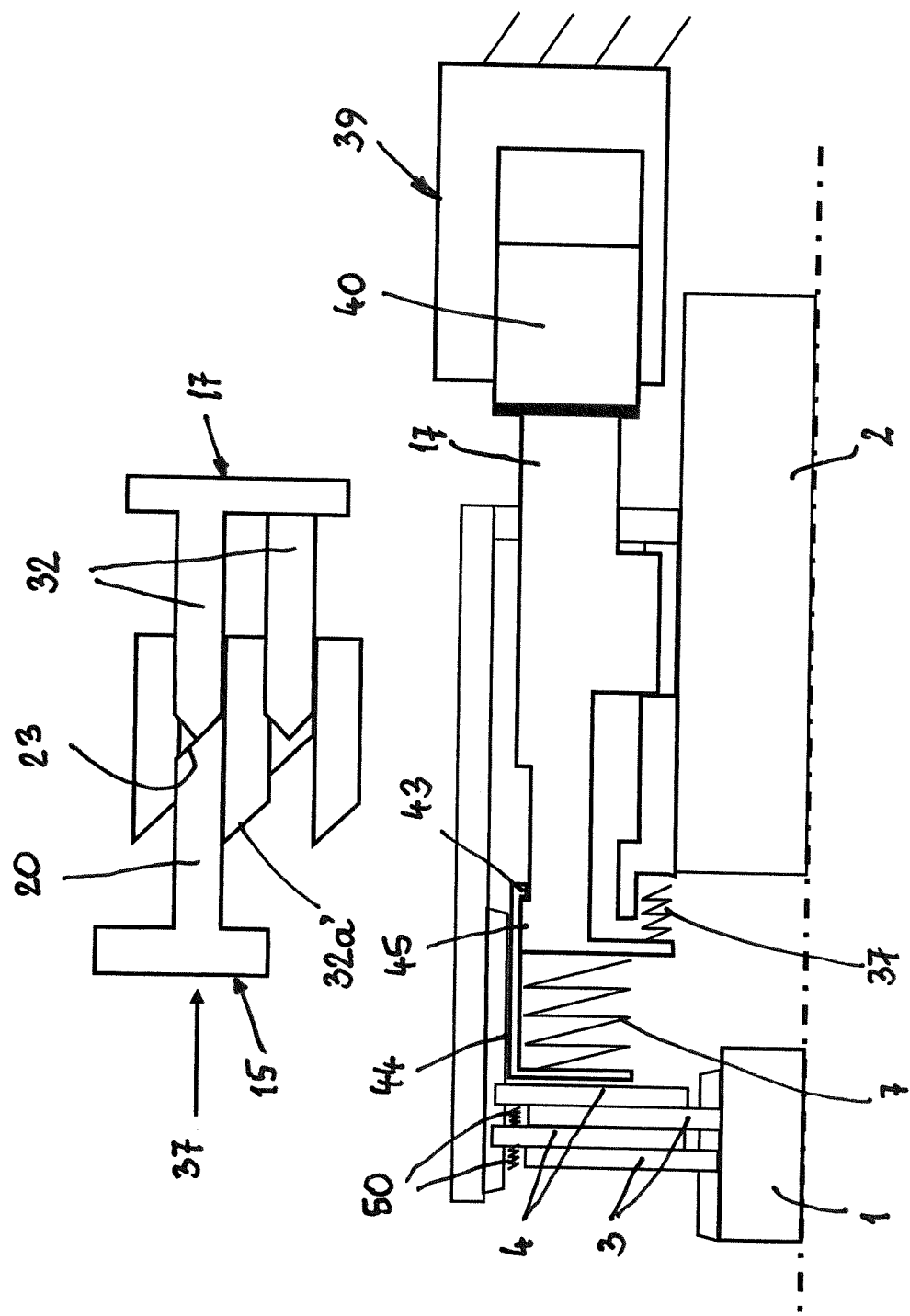

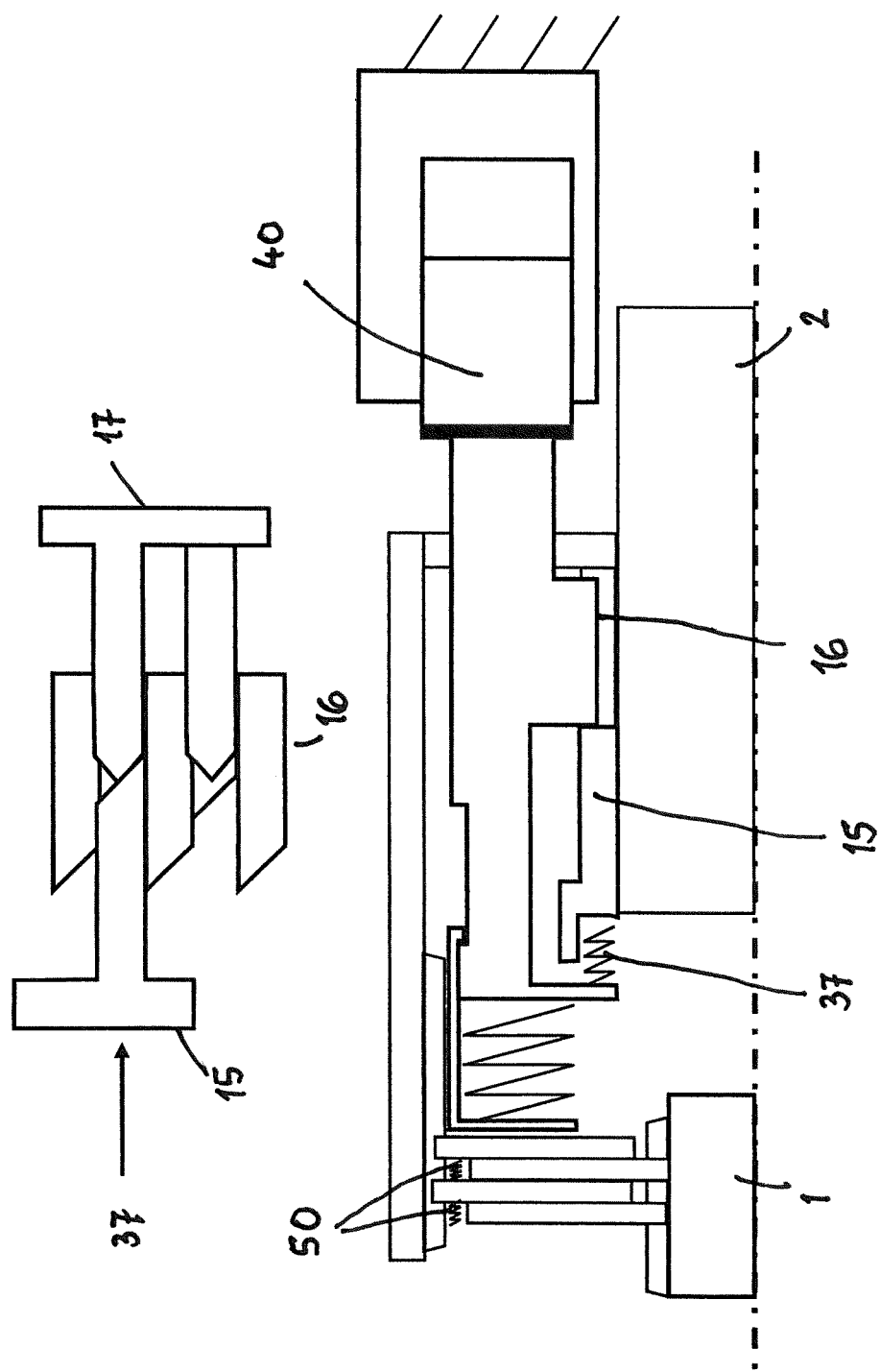

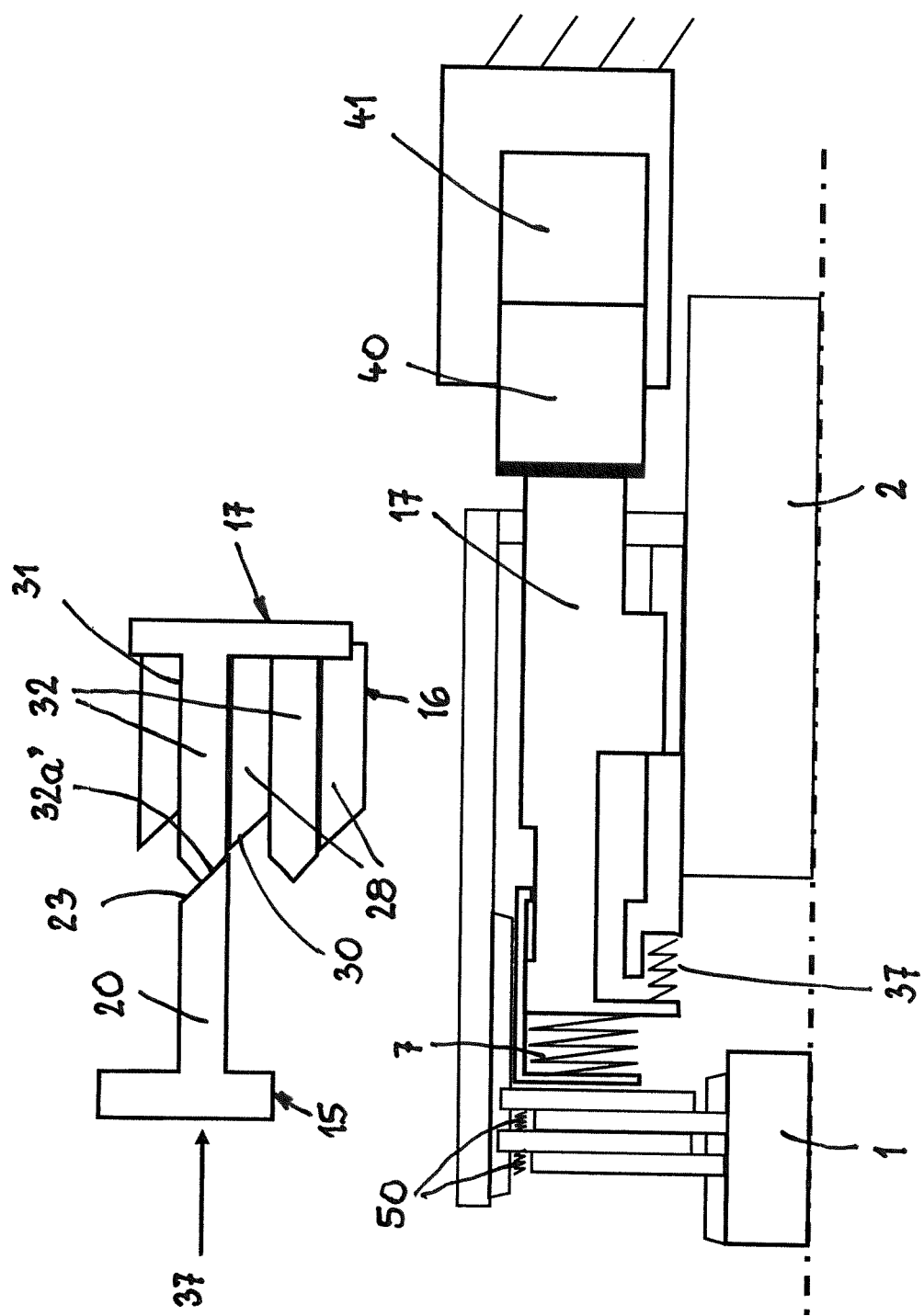

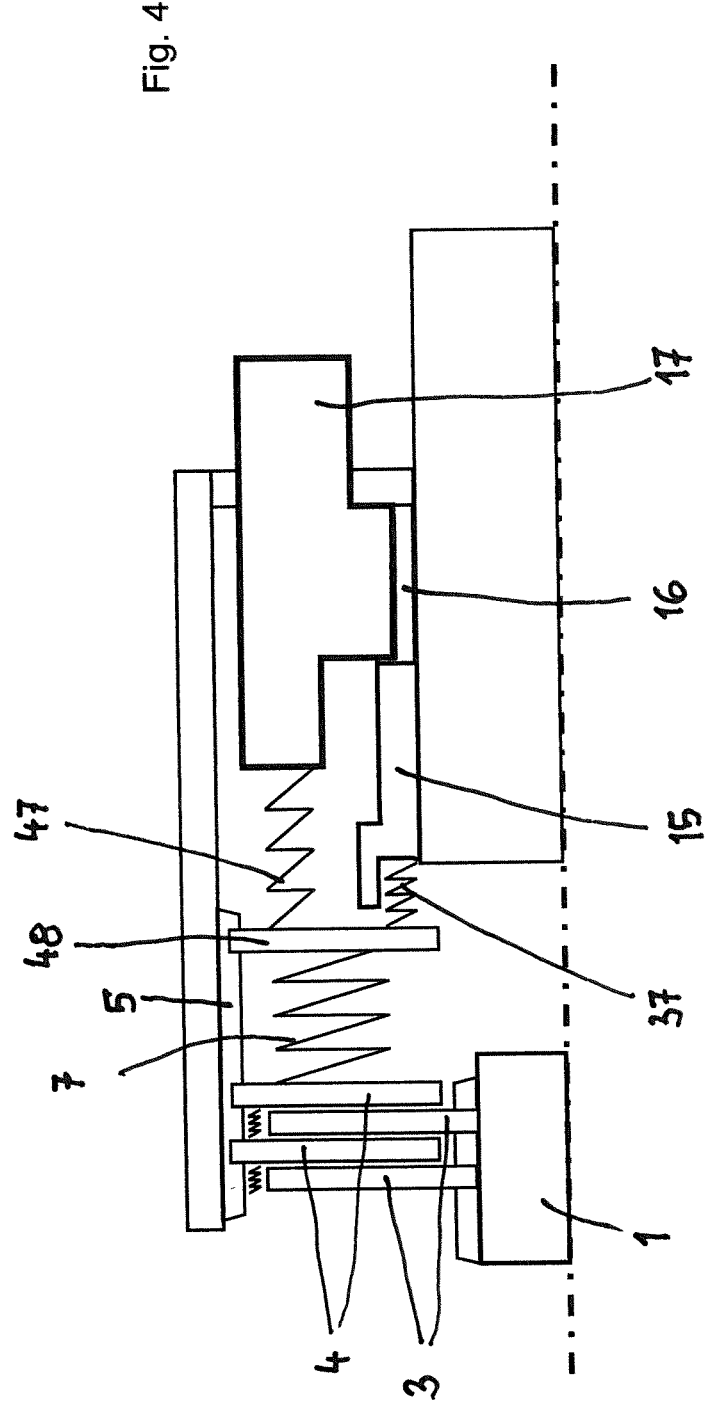

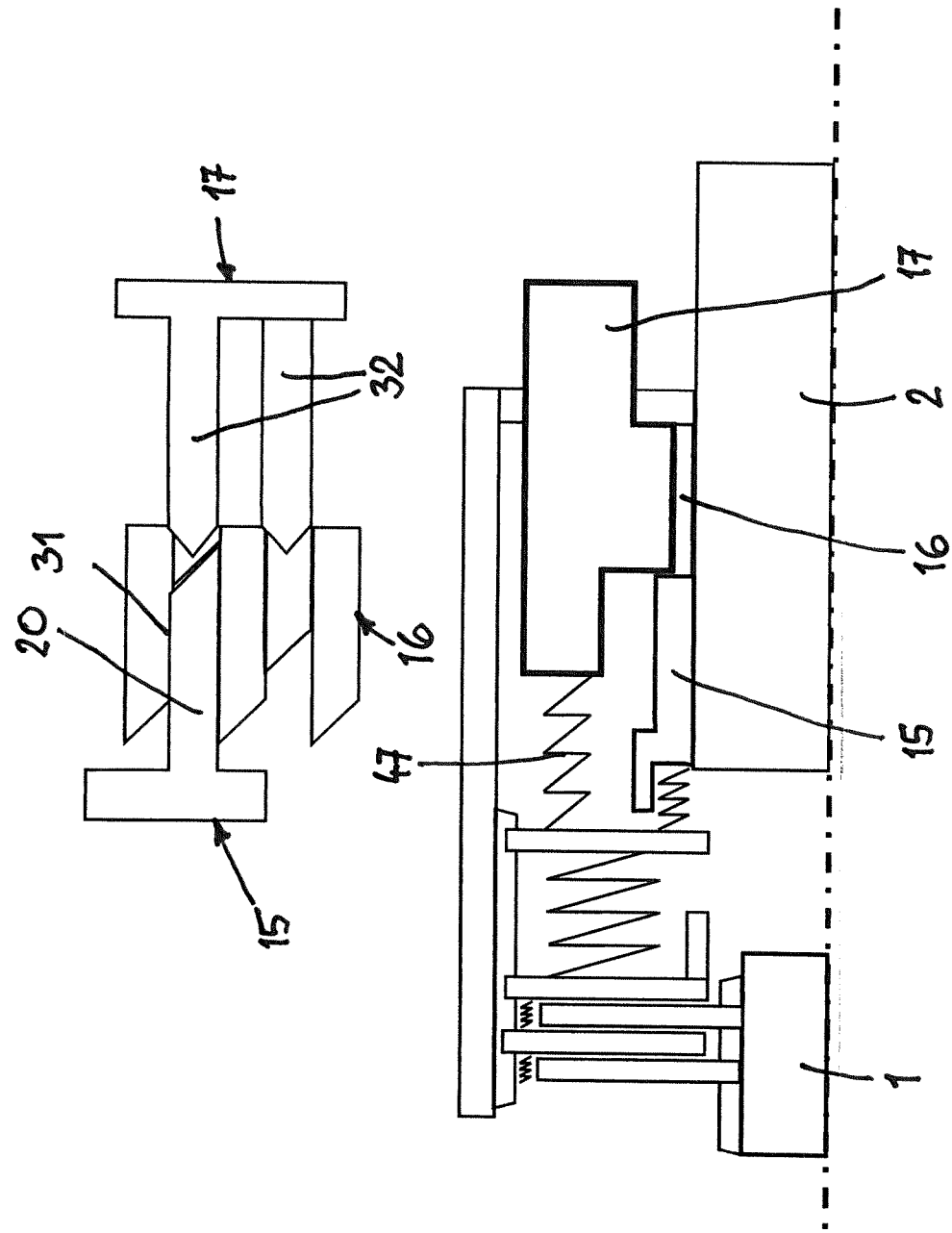

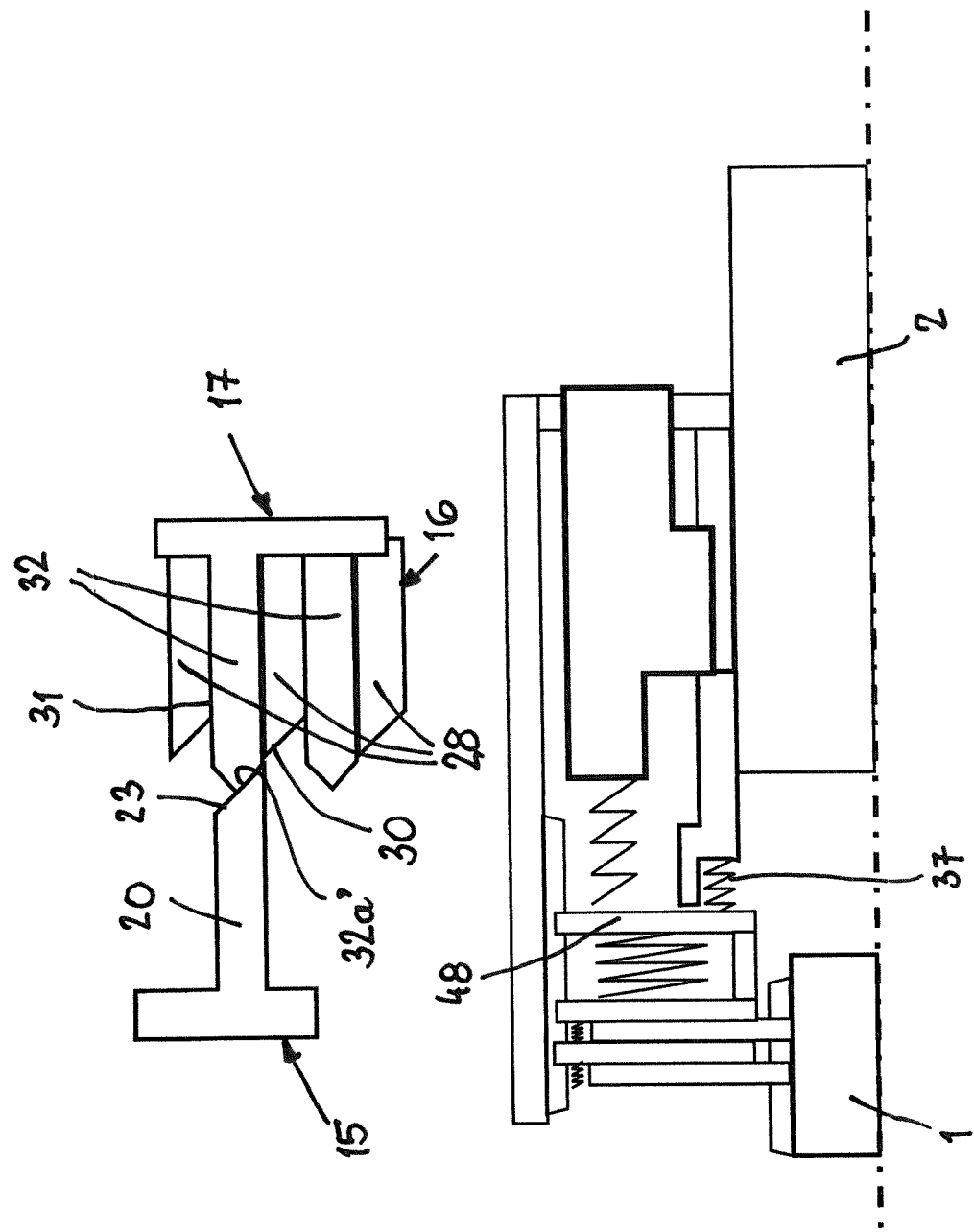

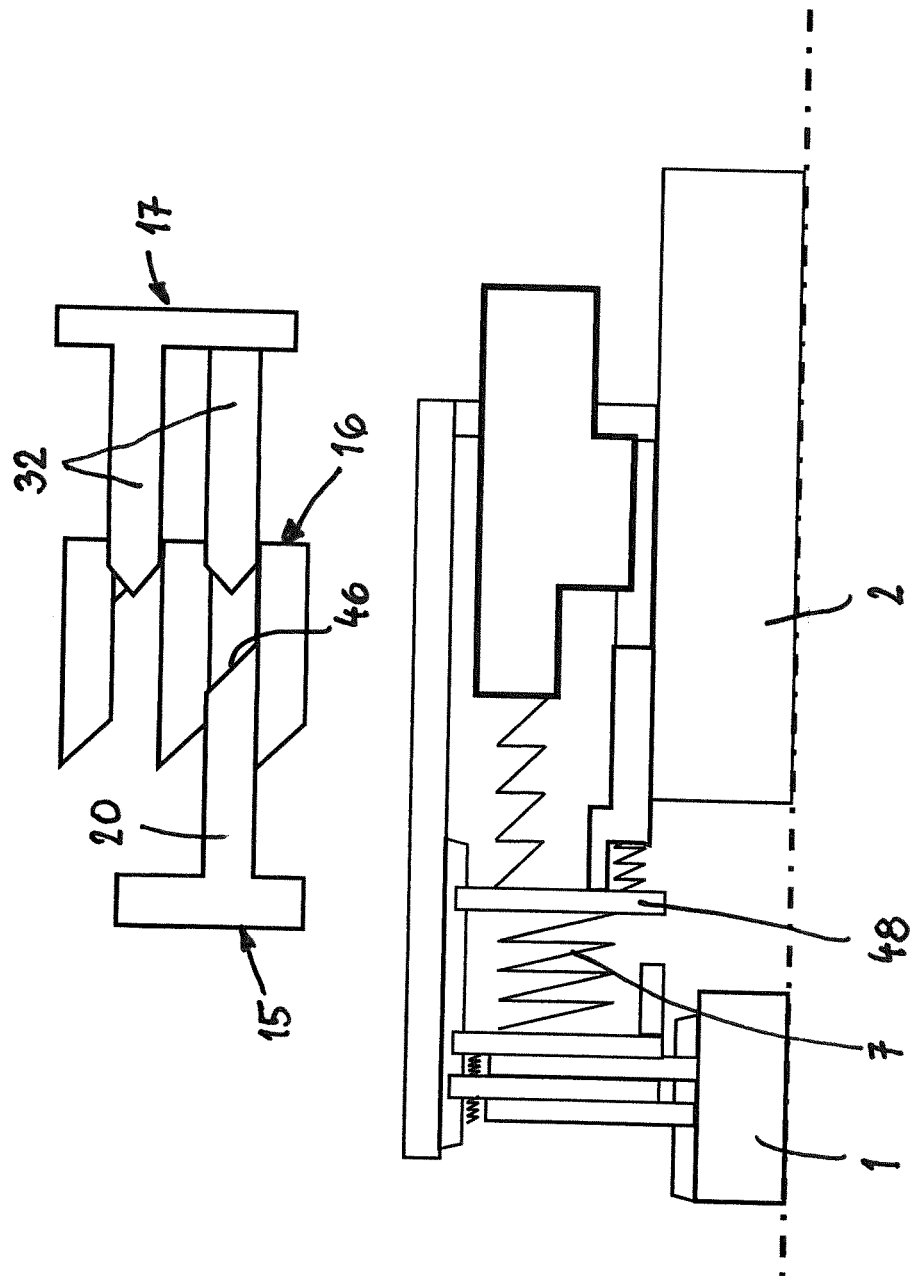

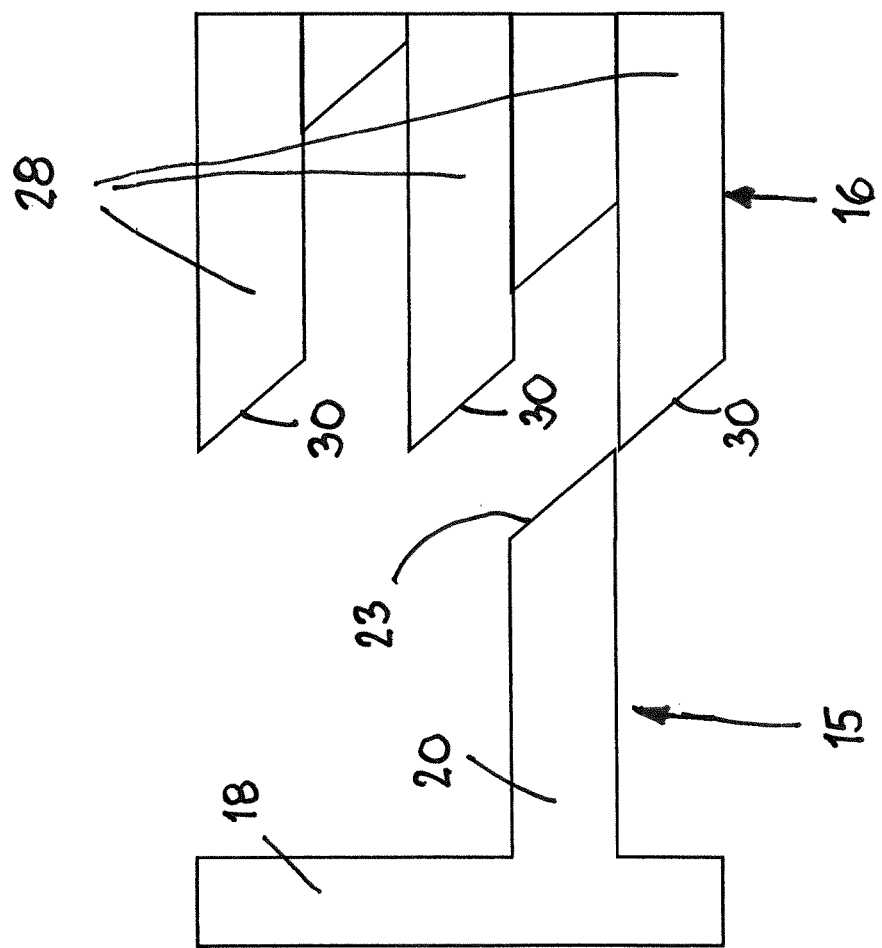
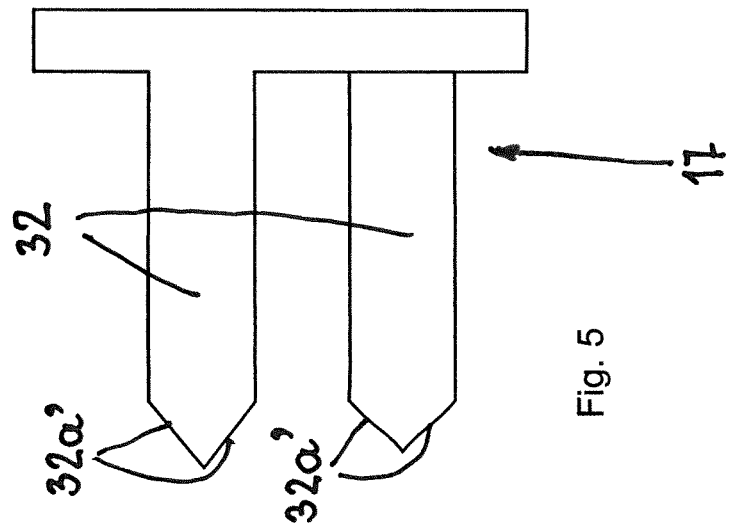
Fig. 5

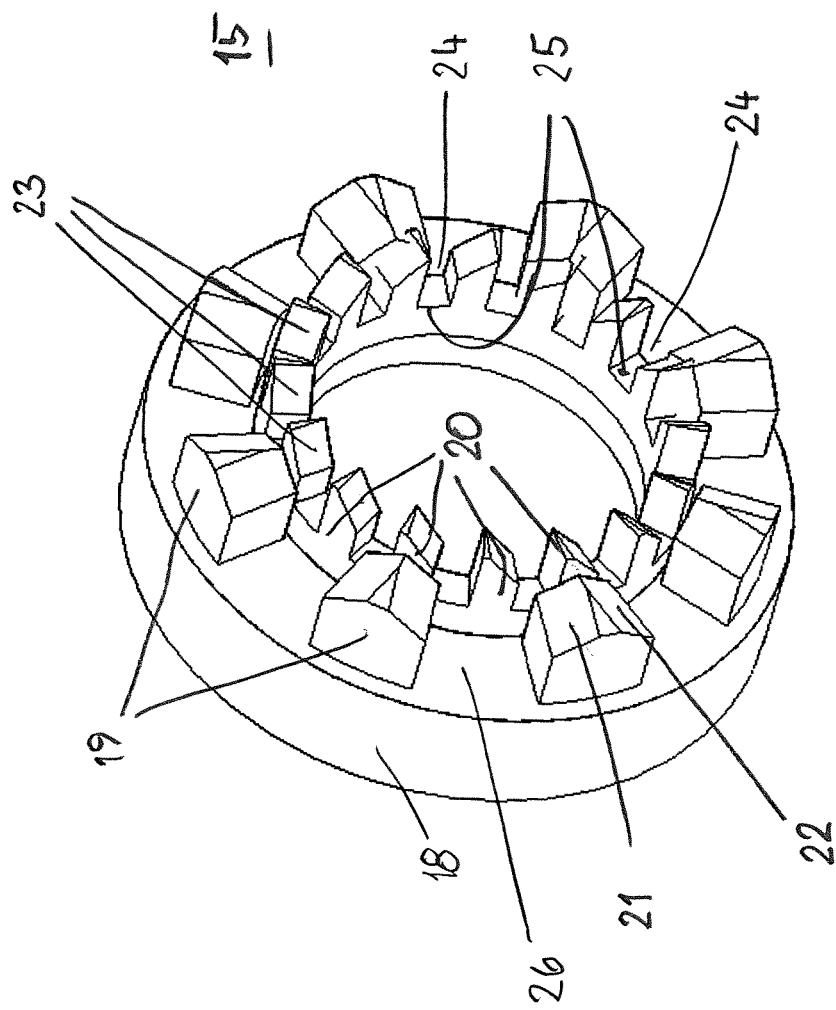

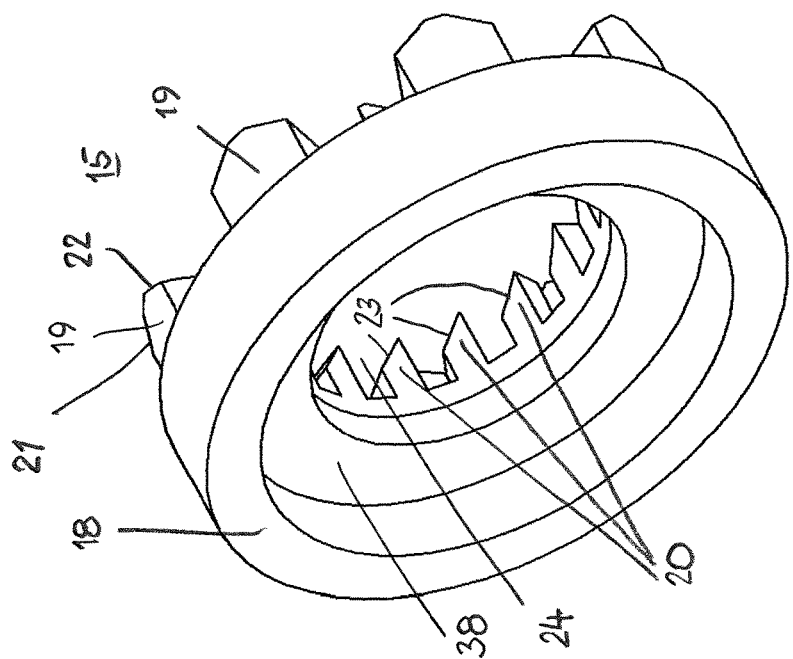
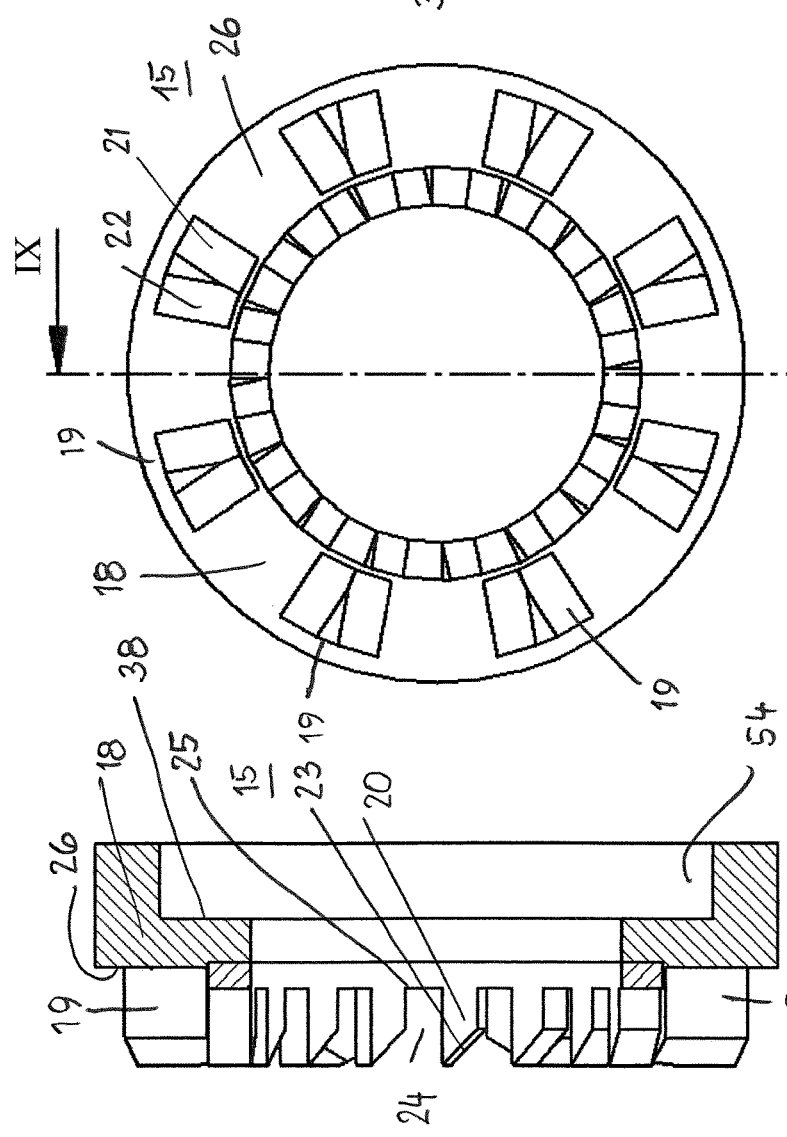
Fig. 10
Fig. 8
Fig. 9

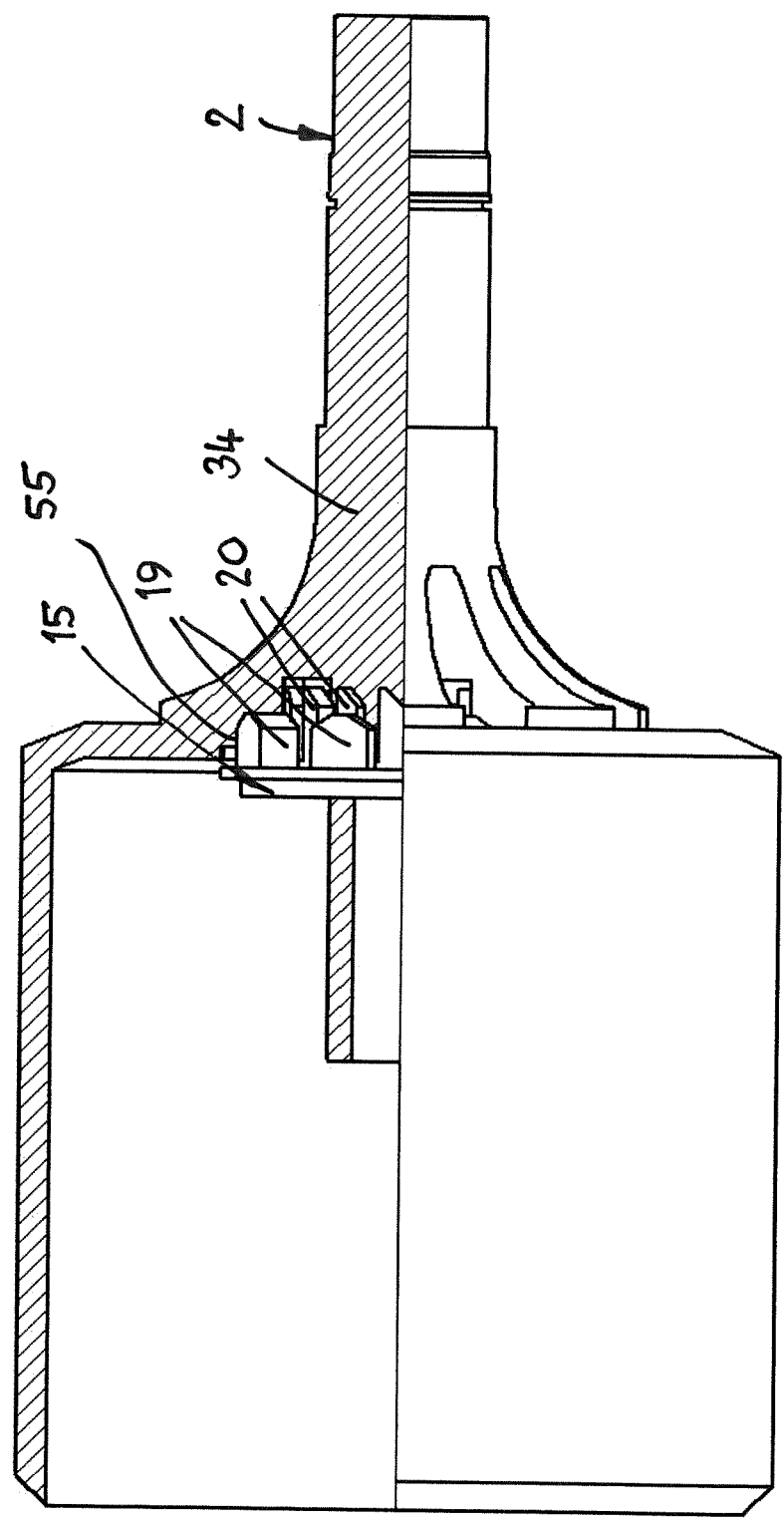

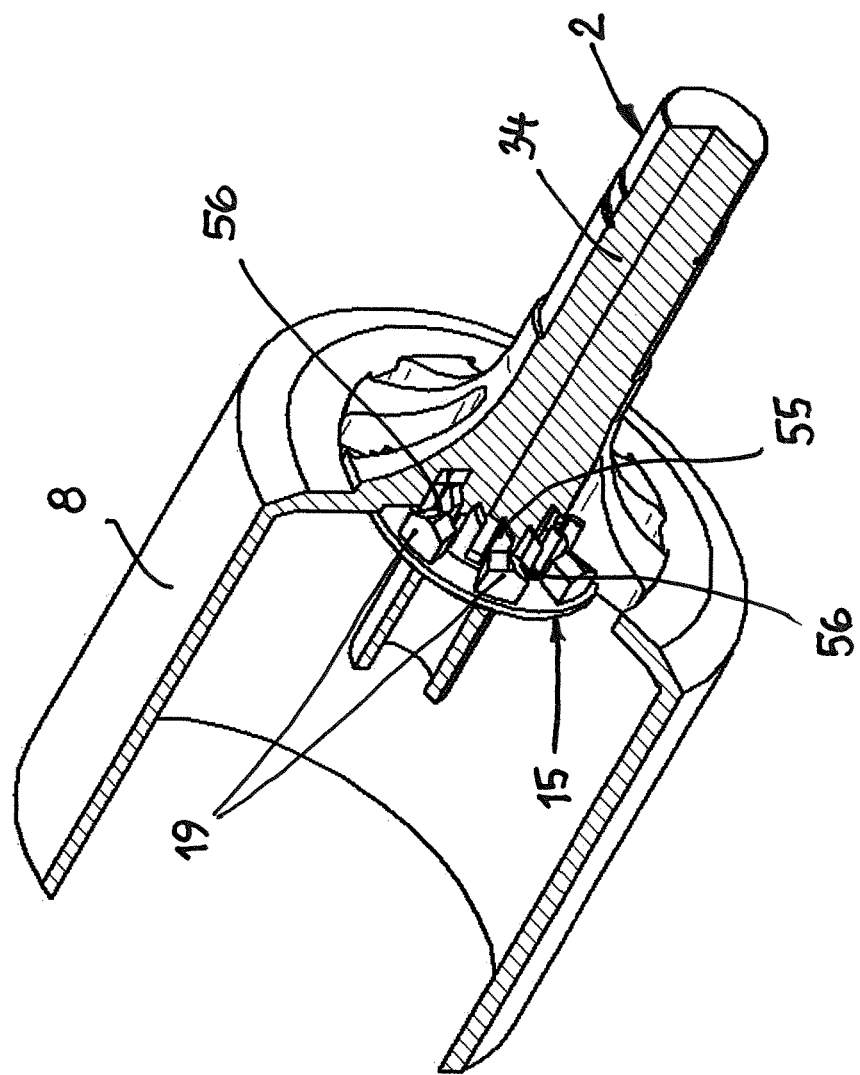

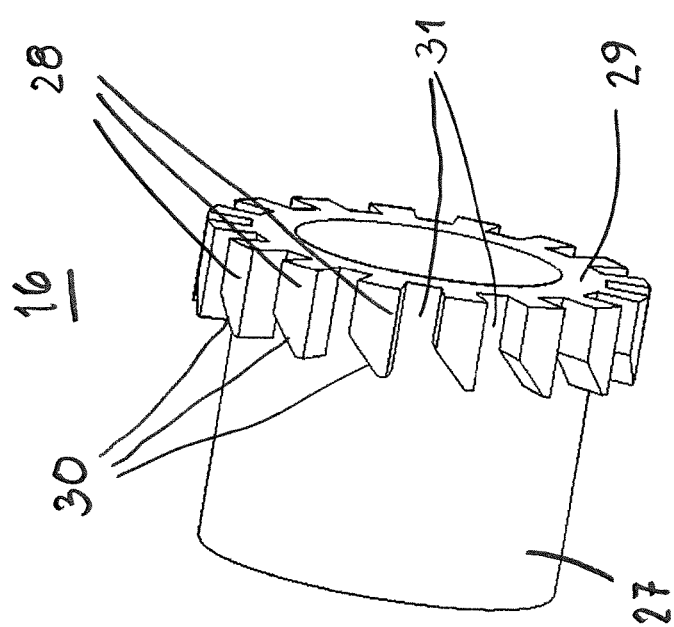

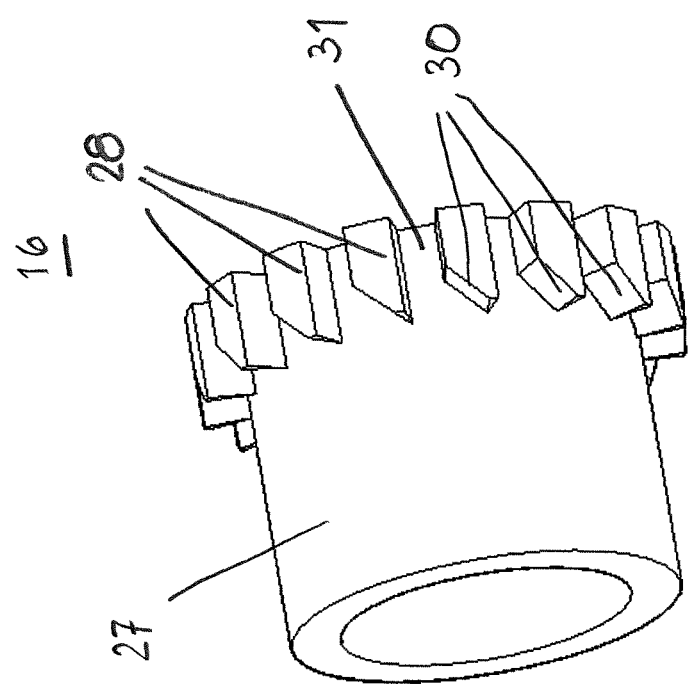

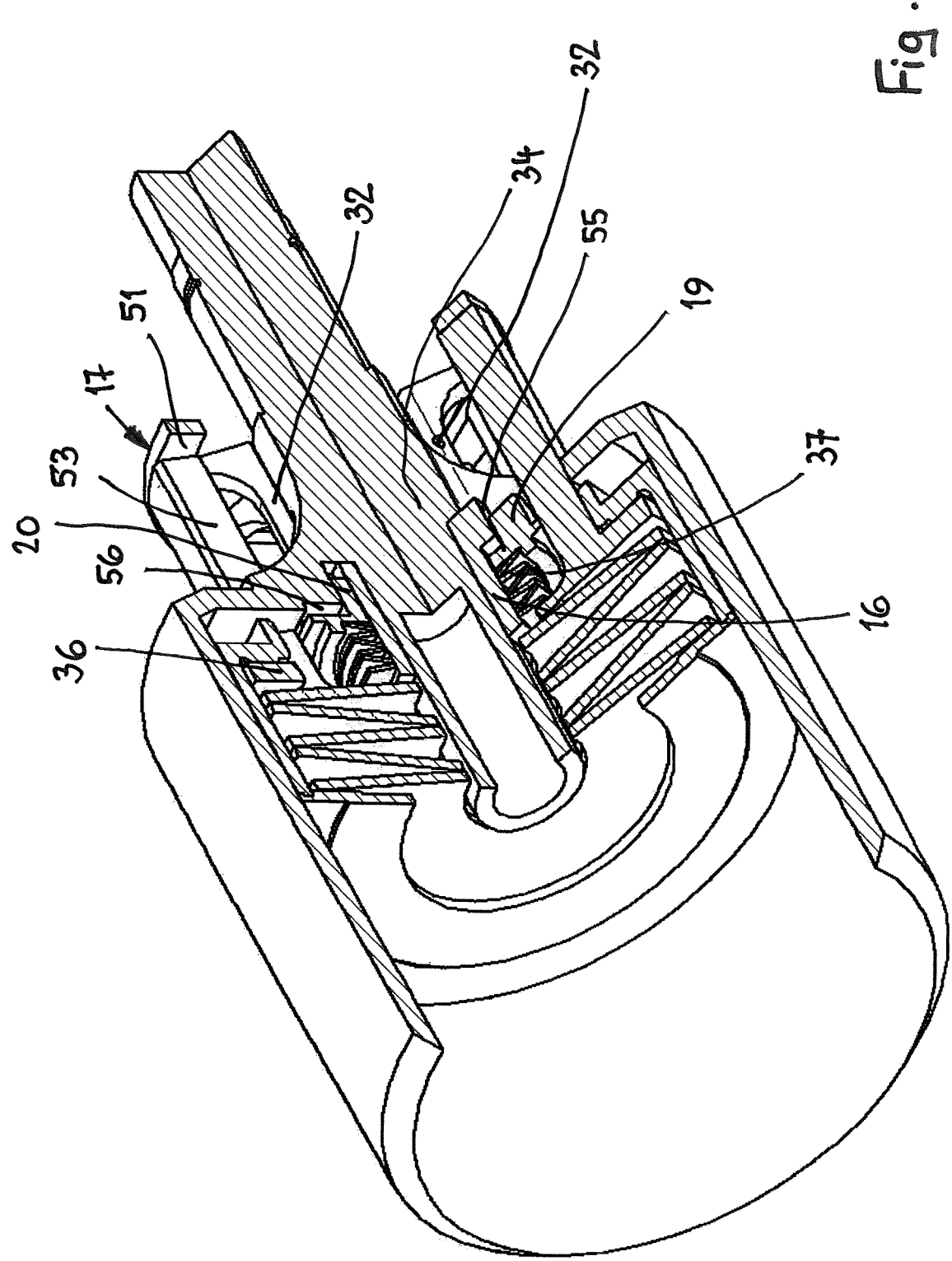

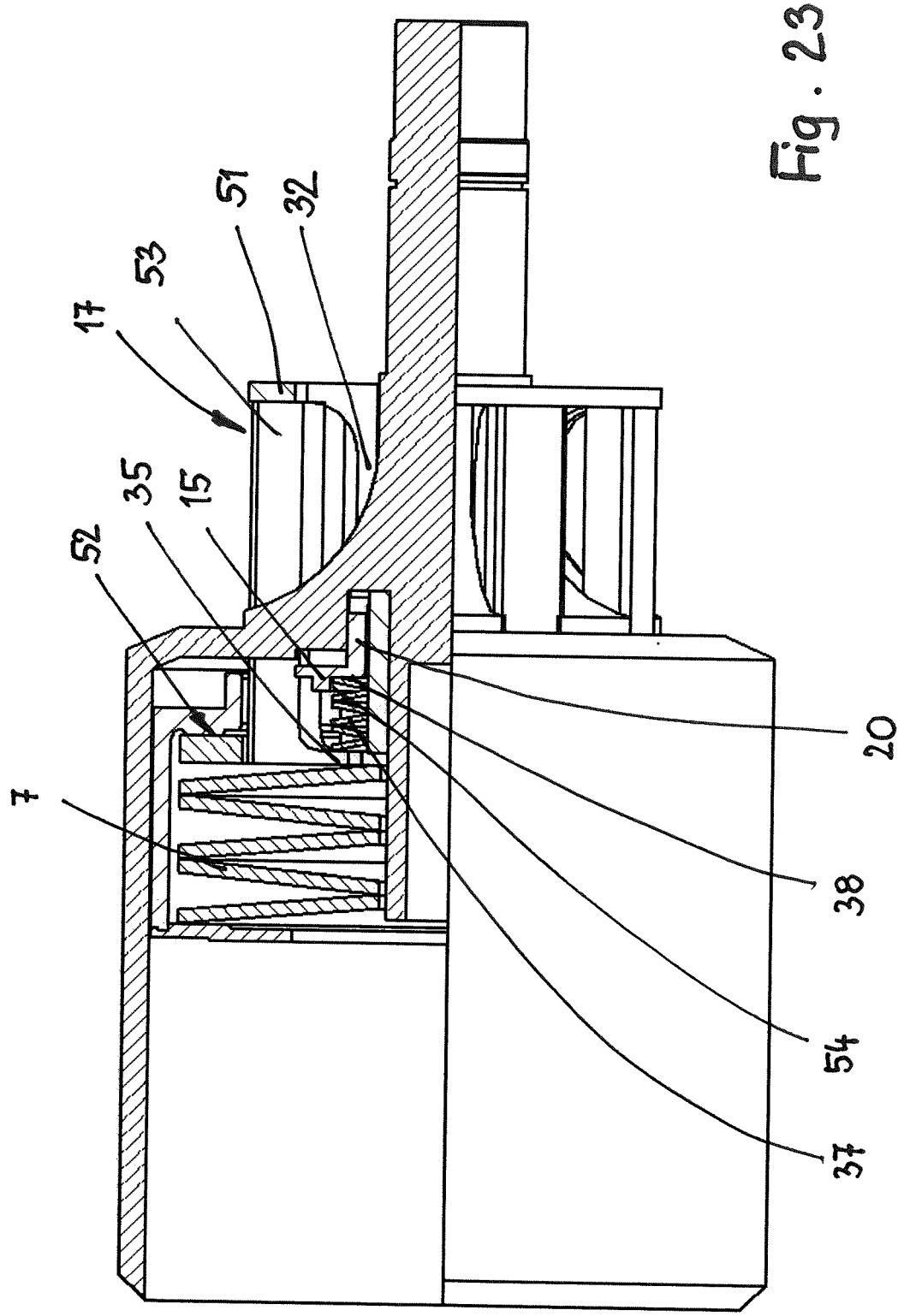

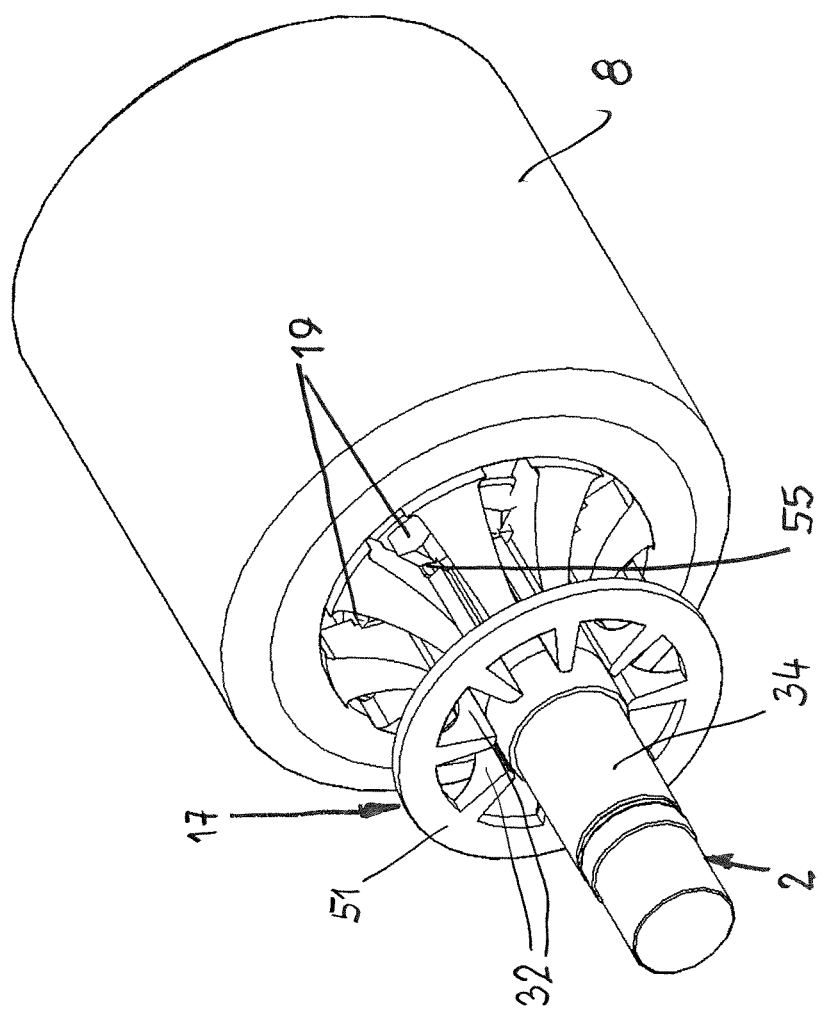

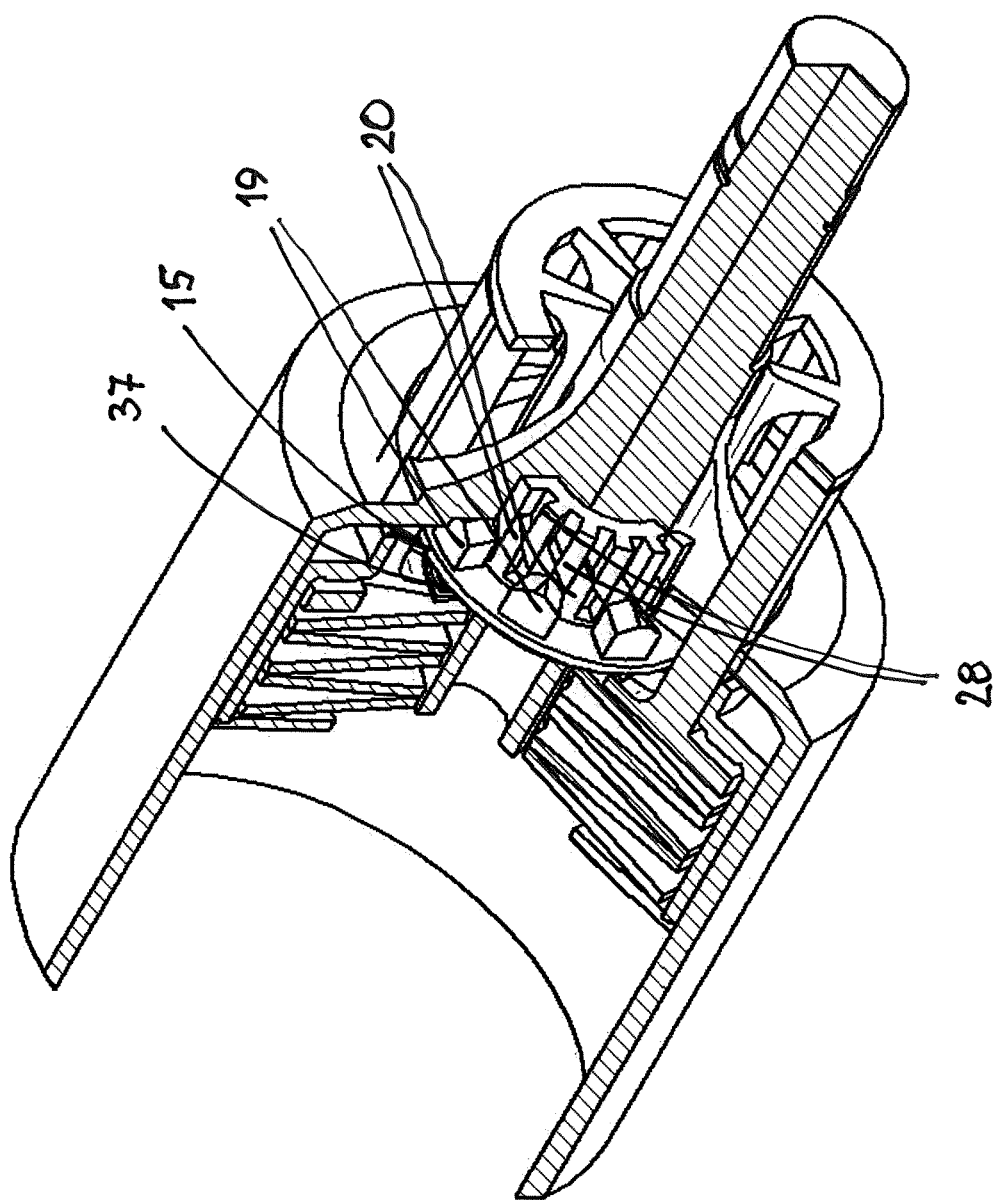

DISC PACK COUPLING

BACKGROUND OF THE INVENTION

The invention concerns a disc pack coupling for torque transmission between two shafts, with a locking unit for maintaining the contact pressure which is acting on the coupling discs when the coupling is closed.

By means of disc pack couplings, torques are transmitted between shafts. For this purpose, it is necessary to press together the discs of the disc pack coupling in axial direction. For this purpose, usually hydraulic pistons are used which are kept under pressure when the coupling is closed and the discs are pressed against each other. When opening the disc pack coupling, the hydraulic pistons are generally pushed back into their initial position by spring elements. The disc pack couplings are usually designed such that, in case of hydraulic or electrical failure of the transmission, they can be opened or closed in a failsafe manner in order to separate the drive side and the output side from each other. Since the actuating pressure must be maintained permanently in such disc pack couplings, an energy demand due to holding the hydraulic piston in the closed or open state is produced in addition to the actuation energy. The supply lines as well as the pressure chambers in which the hydraulic pistons are located are loaded permanently with pressure which has a disadvantageous effect on the seals. Also, leakages of the hydraulic medium must be compensated.

It is also known to provide locking units in order to lock the closed disc pack coupling. In such known disc pack couplings, the actuation pressure in the locking state must be maintained also, even though at a reduced level, in order to lock the respective locking element, for example, a ball or a ring, and thus keep the disc pack coupling selectively in the open or closed operating state. In addition to the actuating energy, an energy demand is therefore also required in this case in order to hold the coupling in the closed or open state.

The invention has the object to configure the disc pack coupling of the aforementioned kind such that the energy demand for holding the disc pack coupling in the closed or open state can be reduced.

SUMMARY OF THE INVENTION

This object is solved for the disc pack coupling of the aforementioned kind in accordance with the invention in that the locking unit comprises at least one locking part, at least one guide part, at least one actuating element, and at least one pressure element, in that the guide part is non-rotatably and non-displaceably arranged in relation to the first shaft, in that the locking part is rotatable about its axis and displaceable in axial direction, and in that the locking part and the guide part comprise control surfaces which are interacting which with each other and which are positioned at a slant in relation to the rotational direction of the locking part and serve for moving the locking part into two stop positions, and in that the locking part in the first stop position maintains the contact pressure on the coupling discs.

The locking device is designed such that it takes over completely the holding function in the closed or open state of the disc pack coupling. No actuating energy is required for maintaining the contact pressure acting on the discs. In this way, a high efficiency of the coupling/braking system is provided. The locking part can be adjusted into two different stop positions. In one stop position, the locking part maintains the contact pressure on the discs of the disc pack coupling while in the other stop position it is retracted so far that it no longer acts on the discs so that the coupling can be opened. In order to move the locking part into the different stop positions, the locking part is axially displaced correspondingly by means of the actuating element. Since the control surfaces are positioned at a slant in relation to the rotational direction of the locking part, the locking part, when axially loaded, is rotated about its axis such that it can reach the respective stop position.

The locking part forms a mechanical stop by means of which the contact pressure required on the discs can be simply and reliably maintained.

The disc pack coupling according to the invention can be employed particularly advantageously in high-speed applications in electromobility where rotational speeds between 10,000 rpm and approximately 50,000 rpm may occur.

In a simple embodiment, the locking part surrounds the first shaft and is supported thereon to be axially slidable and rotatable.

In a preferred embodiment, the locking part is provided with at least one axially extending cam which engages axially extending grooves of the guide part. In this way, the locking part and the guide part are properly aligned relative to each other. The cam and the grooves ensure that the locking part can be reliably axially displaced for adjustment into the two stop positions.

In an advantageous embodiment, the grooves of the guide part are delimited by ribs that project away from the outer side of the guide part.

A compact configuration of the locking unit results when the guide part surrounds the first shaft. The guide part can be non-rotatably and axially non-slidably fastened on it in a simple way.

The grooves of the guide part are advantageously open at both axial ends. In this way, there is the possibility that the cam of the locking part can be inserted at one end and the actuating element at the other end into the grooves of the guide part.

In the grooves of the guide part, stops can be provided where the cam of the locking part will come to rest in the respective stop position.

A simple embodiment is provided when the stops in the grooves of the guide part are provided at different depths. In this way, the different stop positions of the locking part are provided. When the stops are deep down in the grooves, the cam can be inserted correspondingly far into these grooves so that the locking part only minimally projects in axial direction past the guide part.

When the stops in the grooves of the guide part are provided less deep, the cam of the locking part cannot engage far into these grooves so that the locking part projects correspondingly far past the guide part.

In another advantageous embodiment, the locking part is provided with additional cams which engage recesses of the first shaft.

So that the locking part can move into the different axial positions and be held therein, the shaft-side recesses have different axial depths in the axial direction of the first shaft.

A simple adjustment of the locking part results when the actuating element is supported axially slidably relative to the first shaft and comprises fingers which can be pushed into the grooves of the guide part. With the fingers, the cam of the locking part can be pushed out of the grooves of the guide part when the locking part is to be adjusted into the new stop position.

The end faces of the fingers of the actuating element and the end face of the cam of the locking part are advantageously embodied to extend at a slant. When the fingers of the actuating element push the cam of the locking part out of the grooves of the guide part, the slanted end faces of the cam and of the fingers are resting flat against each other so that the cam can be displaced reliably in the grooves.

Preferably, the end faces of the ribs of the guide part and of the cam of the locking part are positioned at a slant in relation to the rotational direction of the locking part. These slanted end faces form the control surfaces with which the rotational direction of the locking part is initiated upon axial loading.

In order to move the locking part into the respective stop position, the cam of the locking part is pushed by the fingers of the actuating element out of the grooves of the guide part. The fingers of the actuating element are pushed so far in this context that their end faces are positioned approximately aligned with the end faces of the ribs of the guide part. Since the end face of the cam of the locking part extends also at a corresponding slant and the locking part is axially loaded in the direction toward the guide part, the locking part is rotated about its axis as a result of the slanted end faces so that subsequently the cam of the locking part can engage the corresponding groove of the guide part or the shaft-side recess.

The subject matter of the invention not only results from the subject matter of the individual claims but also from all specifications and features disclosed in the drawings and the description. They are claimed as important to the invention, even though they are not subject matter of the claims, inasmuch as, individually or in combination, they are novel relative to the prior art.

Further features of the invention result from the additional claims, the description, and the drawings.

BRIEF DESCRIPTION OF THE DRAWINGS

The invention will be explained in more detail with the aid of some embodiments illustrated in the drawings.

FIG. 1 shows in schematic illustration a disc pack coupling according to the invention with an integrated locking unit.

FIG. 2 shows in schematic illustration a second embodiment of a disc pack coupling according to the invention with an integrated locking unit.

FIGS. 2a, 2b, 2c, 2d, and 2e show different positions of the disc pack coupling and the locking unit during the coupling and locking process.

FIG. 3 shows in schematic illustration a further embodiment of a disc pack coupling according to the invention with integrated locking unit.

FIGS. 3a, 3b, 3c, 3d, 3e, and 3f show different coupling states of the disc pack coupling according to FIG. 3.

FIG. 4 shows in schematic illustration a further embodiment of a disc pack coupling according to the invention with integrated locking unit.

FIGS. 4a, 4b, 4c, and 4d shows different coupling positions of the disc pack coupling according to FIG. 4.

FIG. 5 shows in schematic illustration components of the locking unit according to the invention.

FIG. 7 shows in perspective illustration a locking part of the disc pack coupling according to FIG. 6.

FIG. 8 shows an end view of the locking part according to FIG. 6.

FIG. 9 shows a section along the line IX-IX in FIG. 8.

FIG. 10 shows in perspective rear view the locking part according to FIG. 7.

FIG. 11 shows in side view and partially in section the locking part according to FIG. 7 in mounted position.

FIG. 12 shows in perspective illustration the locking part according to FIG. 7 in mounted position.

FIG. 13 shows in perspective illustration a guide part of the disc pack coupling according to FIG. 6.

FIG. 14 shows in another perspective illustration the guide part according to FIG. 13.

FIG. 22a shows in another perspective and partially sectioned illustration the locking unit when the disc pack coupling is open.

FIG. 23 shows in partial axial section view the locking unit when the disc pack coupling is open.

FIG. 24 shows in perspective illustration the actuating element of the locking unit provided on the first shaft.

FIG. 26 shows in perspective and partially sectioned illustration the locking unit when the disc pack coupling is closed.

DESCRIPTION OF PREFERRED EMBODIMENTS

The disc pack couplings disclosed in the following are characterized in that a locking unit takes over the holding function in the closed or open state of the disc pack coupling. For maintaining the contact pressure, no energy is required. In this way, the efficiency of the coupling/braking system is increased.

Figure 6:
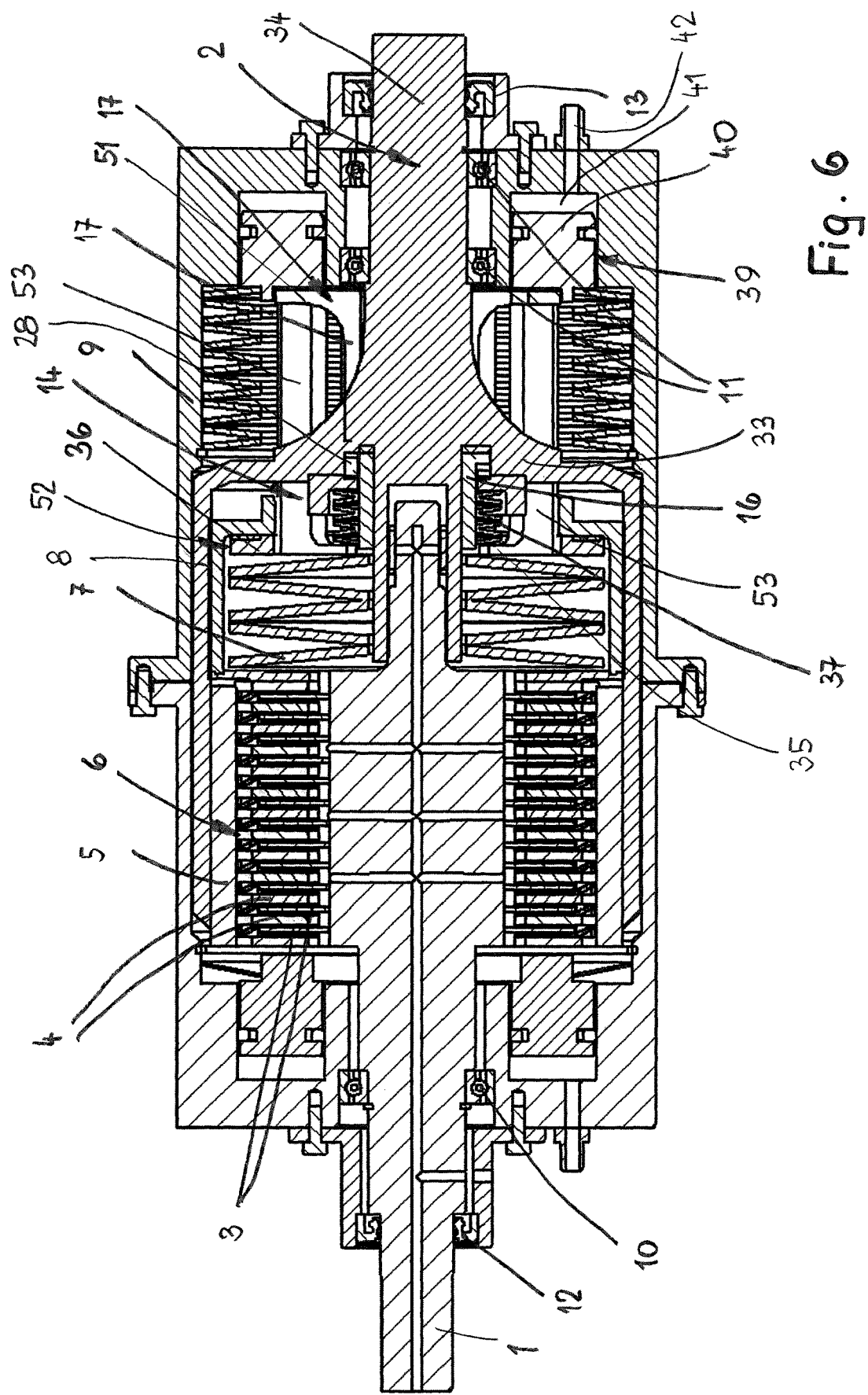
FIG. 6 shows an axial section through a further embodiment of a disc pack coupling according to the invention with integrated locking unit.
Figure 15:
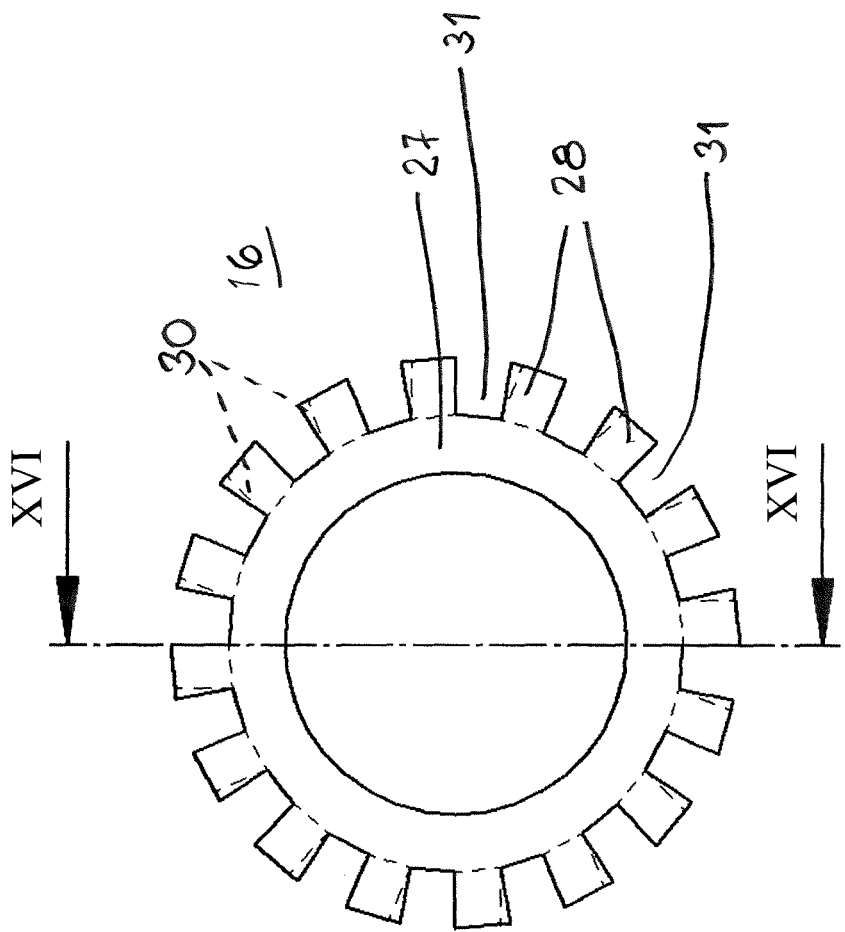
FIG. 15 shows in end view the guide part according to FIG. 13.
Figure 16:
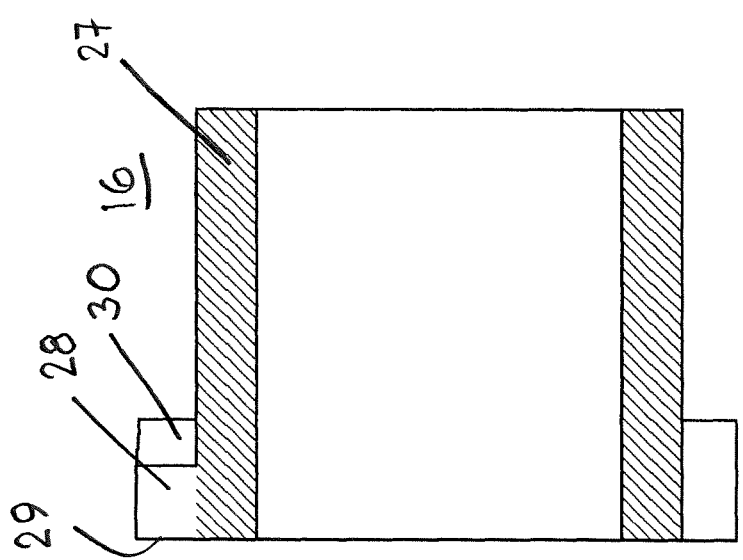
FIG. 16 shows a section along the line XVI-XVI in FIG. 15.

FIG. 6 shows an axial section view of a first embodiment of a disc pack coupling with a locking unit. By means of the disc pack coupling, two shafts 1, 2 can be coupled with each other in such a way that the torque from the shaft 1 can be transmitted to the shaft 2. The shaft 1 is provided with inner discs 3 that are non-rotatably connected to the shaft 1. The inner discs 3 are provided with friction linings (not illustrated). Between the inner discs 3, there are outer discs 4 which are non-rotatably connected to a coupling basket 5. The inner discs 3 and the outer discs 4 form a disc pack 6.

In order to press the discs 3, 4 against each other, at least one coupling spring 7 is provided. Advantageously, a plurality of coupling springs 7 are provided which can be plate springs, for example.

The coupling basket 5 with the outer discs 4 is non-rotatably connected to the shaft 2.

The shaft 2 has a shaft bushing 8 that is provided at its inner wall with the coupling basket 5.

The two shafts 1, 2 are accommodated in a housing 9 in which the shafts 1, 2 are rotatably supported by means of rolling bearings 10, 11.

At the exit from the housing 9, the shafts 1, 2 are sealed by a shaft seal 12, 13, respectively.

In the housing 9, a locking unit 14 is accommodated which comprises a locking part 15 (FIGS. 7 to 10) that is slidable in axial direction on the shaft 2, a guide part 16 (FIGS. 13 to 16) that is non-rotatably and axially non-slidably seated on the shaft 2, as well as a sliding sleeve 17 as an actuating element that is axially slidably arranged on the shaft 2.

The locking unit 14 is characterized in that its actuation in axial direction is realized by the sliding sleeve 17 in order to move the locking part 15 relative to the guide part 16.

The locking part 15 (FIGS. 7 through 10) has an annular base body 18 which is axially slidable and rotatable relative to the shaft 2. At its first end face, the base body 18 has axially projecting cams 19, 20. The cams 19 can be wider than the cams 20 in circumferential direction of the base body 18.

The cams 19 are positioned on a larger diameter than the cams 20 which in addition have a smaller spacing relative to each other in circumferential direction than the outer cams 19.

The cams 19 have pitched roof-shaped end surfaces 21, 22 which in circumferential direction of the base body 18 are positioned oppositely slanted relative to each other.

The inner cams 20, on the other hand, have slanted end surfaces 23 which are provided with a slant in the same circumferential direction.

Between the inner cams 20, rectangular recesses 24 are formed whose bottom 25 has an axial spacing from the end face 26 of the base body 18.

The locking part 15 serves to maintain in a corresponding axial position the contact pressure on the discs 3, 4.

In this context, the locking part 15 interacts by means of its cams 19 with the shaft 2 on which the locking part 15 is non-rotatably and non-slidably seated.

The guide part 16 (FIGS. 13 to 16) comprises a sleeve 27 by means of which the guide part 16 is fastened to the shaft 2. At its end face which is facing away from the locking part 15, the guide part 16 is provided with ribs 28 which are distributed about the circumference of the sleeve 27 and project radially past the sleeve wall. The ribs 28 extend axially away from the first end face 29 of the guide part 16 across a portion of the axial length of the sleeve 27.

The ribs 28 each have a slanted end face 30 whose slant is the same as the slant of the end surfaces 23 of the cams 20 of the locking part 15.

Between neighboring ribs 28, axially extending grooves 31 are formed whose width corresponds to the width of the cams 20 of the locking part 15. The grooves 31 of the guide part 16 are open toward the end face 29 of the guide part 16.

Figure 17:
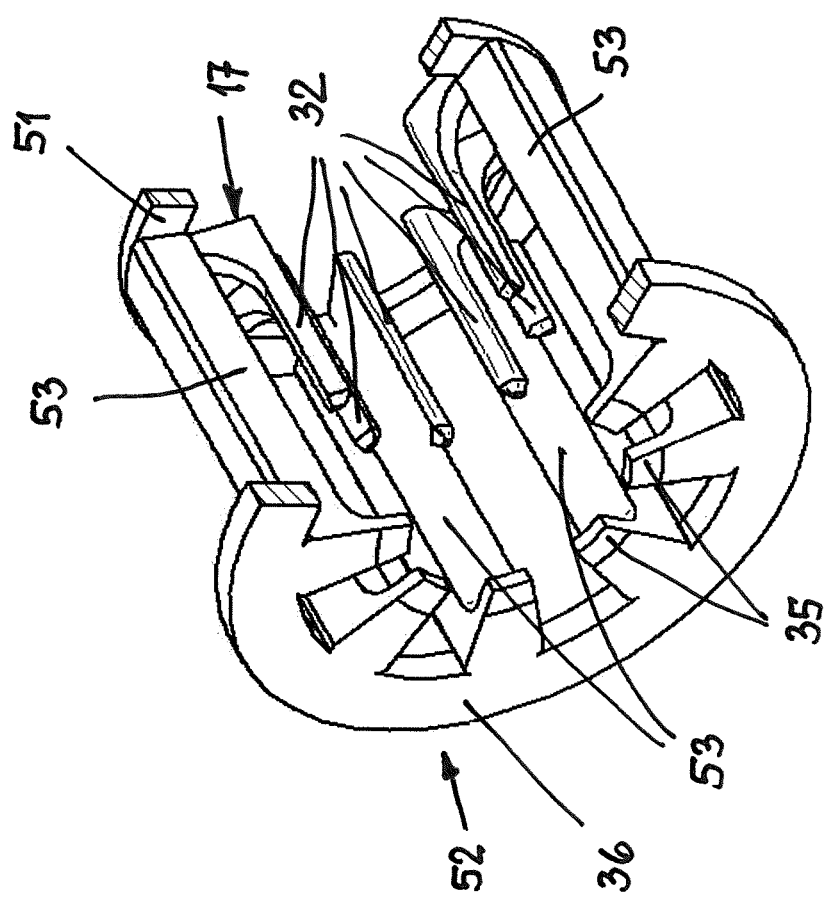
FIG. 17 shows an actuating element and a piston element of the disc pack coupling according to FIG. 6 in perspective and partially sectioned illustration.
Figure 18:
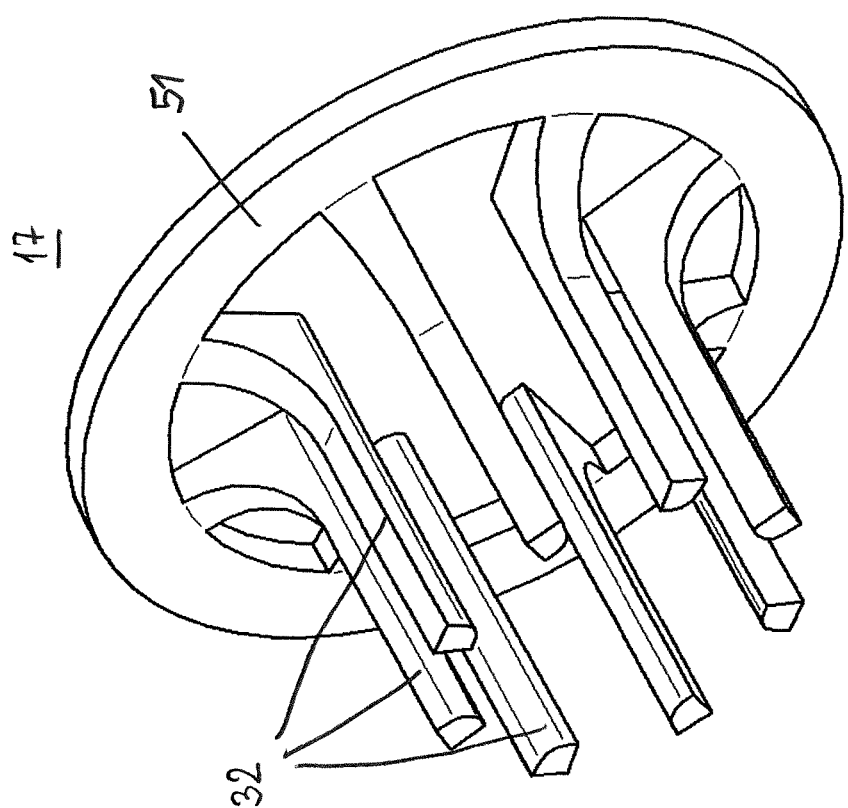
FIG. 18 shows in perspective illustration the actuating element according to FIG. 17.
Figure 19:
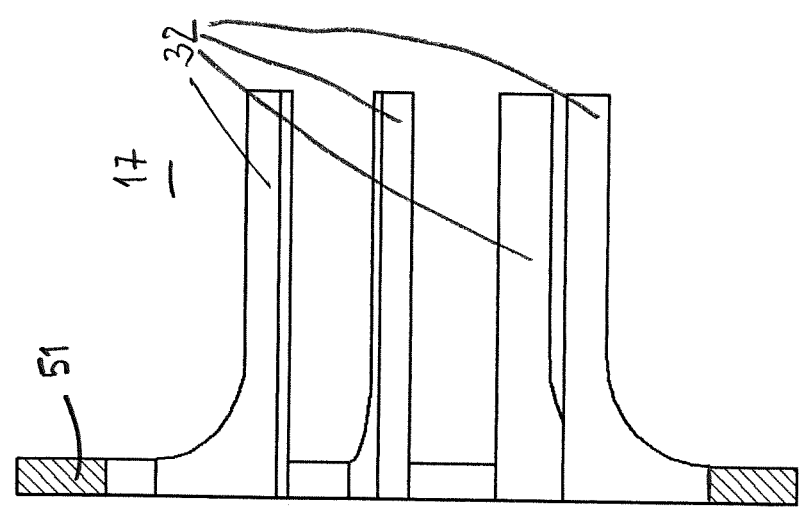
FIG. 19 shows a section through the actuating element according to FIG. 18.

The sliding sleeve 17 (FIGS. 17 to 19) is axially slidable on the shaft 2. The sliding sleeve 17 comprises fingers 32 which are provided at the inner side of the sliding sleeve 17 and which extend axially. The fingers 32 project away from a terminal ring 51 which is advantageously formed as one piece together with the fingers 32.

Figure 20:
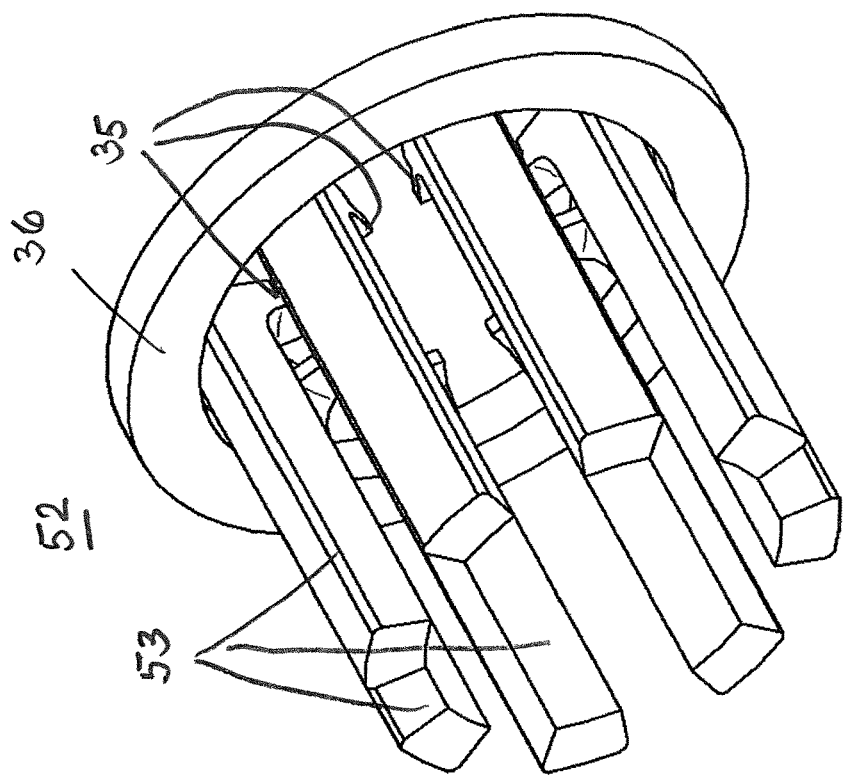
FIG. 20 shows in perspective illustration the piston element according to FIG. 17.
Figure 21:
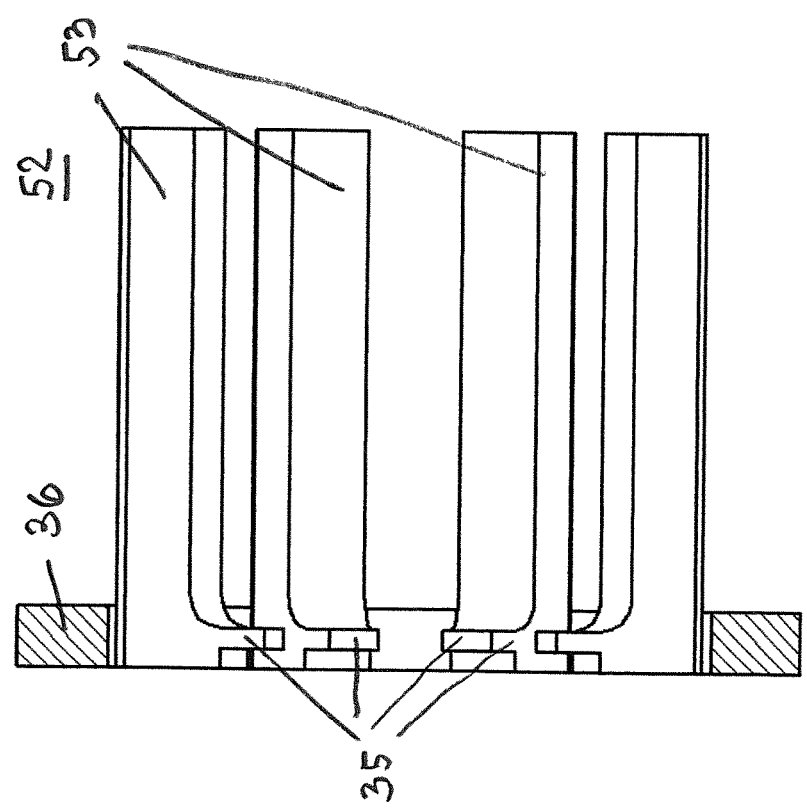
FIG. 21 shows a section through the piston element according to FIG. 20.

The sliding sleeve 17 is connected to a piston element 52 with which the coupling spring 7 can be actuated for closing the disc pack coupling in a way to be described in the following. The piston element 52 (FIGS. 20 and 21) has a terminal ring 36 which is arranged inside the shaft bushing 8 and from which axial fingers 53 project which are arranged along the ring 36 at a spacing from each other. By means of the fingers 53, the two terminal rings 36, 51 are connected to each other.

Radially inwardly projecting tongues 35 project in radial direction (FIGS. 17, 20, and 21) away from the radial inner sides of the fingers 53.

The fingers 53 of the piston element 52 project through a transverse wall 33 (FIG. 6) which connects the shaft bushing 8 with a shaft section 34.

The sliding sleeve 17 and the piston element 52 form a functional unit with which the coupling spring 7 can be subjected to pressure and the locking part 15 can be moved between the different axial positions.

Figure 22:
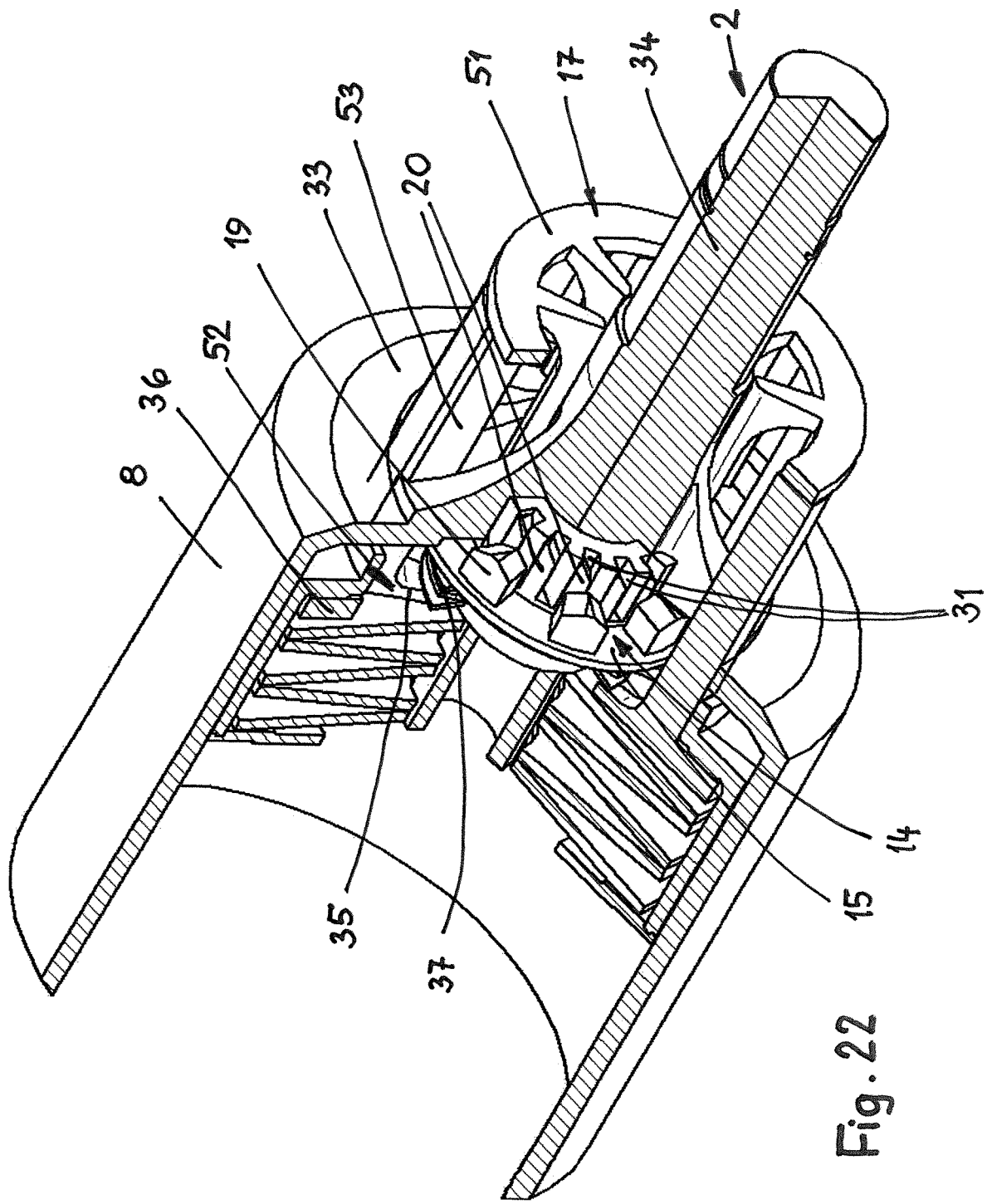
FIG. 22 shows in perspective and partially sectioned illustration the locking unit when the disc pack coupling is open.
Figure 25:
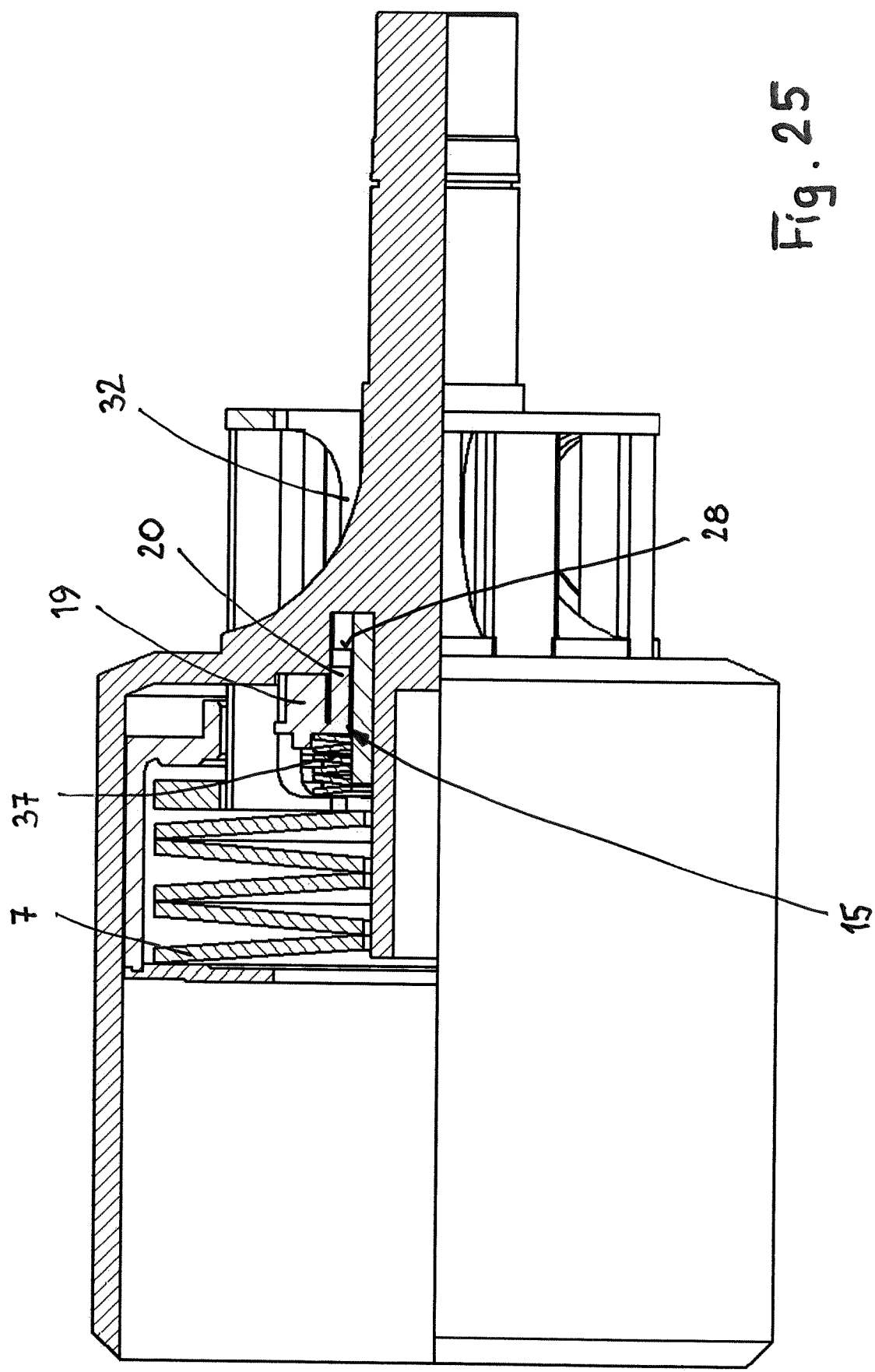
FIG. 25 shows in an illustration corresponding to FIG. 23 the locking unit when the disc pack coupling is closed.

At the tongues 35 of the piston element 52, at least one pressure spring 37 is supported (FIGS. 6, 22, and 23). In the embodiment, a plurality of pressure springs 37 which are resting against each other are provided in the form of plate springs. The pressure spring 37 is supported with its other end at a bottom 38 of an end face annular recess 54 of the base member 18 of the locking part 15 (FIGS. 9 and 10) which is seated on the sleeve 27 of the guide part 16 and is axially supported thereat. The pressure spring 37 ensures thus that the locking part 15 is loaded axially against the guide part 16.

FIGS. 22 to 24 show the locking unit 14 in a position in which the discs 3, 4 are not pressed against each other so that a torque transmission from the shaft 1 to the shaft 2 is not taking place. The locking part 15 is displaced in this context axially in such a way and assumes such a position that the cams 20 engage the grooves 31 of the guide part 16 and the cams 19 engage recesses 55 (FIG. 12) provided at the outer side of the shaft section 34. The sliding sleeve 17 is axially pushed back so far on the shaft 2 that its fingers 32 are positioned outside of the grooves 31 of the guide part 16 (FIG. 23).

The recesses 55 are matched in regard to their contour shape to the cams 19 of the locking part 15. The recesses 55 thus form axial stops for the locking part 15 when its cams 19 engage the recesses 55. This engagement position of the cams 19 of the locking part 15 can be seen in FIG. 24.

Since the cams 19 as well as the cams 20 of the locking part 15 engage the recesses 55 of the shaft section 34 and the grooves 31 of the guide part 16, the locking part 15 in this axial position has its smallest spacing relative to the guide part 16.

Since the sliding sleeve 17 is pushed back, the coupling spring 7 which is axially supported at the piston element 52 is relieved to such an extent that its force is insufficient to press the discs 3, 4 in such a way against each other that a torque transmission from the shaft 1 to the shaft 2 is possible. The pressure springs 37 ensure that the locking part 15 remains in engagement with the guide part 16 and the shaft section 34.

In order to be able to transmit torque from the shaft 1 to the shaft 2, the discs 3, 4 must be pressed axially so strongly against each other that a torque transmission from the shaft 1 to the shaft 2 is possible by means of this disc pack coupling.

For this purpose, the sliding sleeve 17 is displaced by a drive 39 in axial direction. In the embodiment, the drive 39 is a hydraulic drive with an annular piston 40 (FIG. 6) which is slidable seal-tightly within a pressure chamber 41 within the housing 9. A pressure line 42 by means of which a pressure medium can be introduced into the pressure chamber 41 opens into the pressure chamber 41. By pressure loading the annular piston 40, the sliding sleeve 17 is displaced against the force of the coupling spring 7. As shown in FIG. 6, the annular piston 40 acts on the ring 51 of the sliding sleeve 17.

Upon displacement of the sliding sleeve 17, the fingers 32 will contact the cams 20 of the locking part 15 and slide the cams 20 out of the grooves 31 of the guide part 16. At the same time, the cams 19 of the locking part 15 are pushed out of the recesses 55 of the shaft section 34.

Figure 26A:
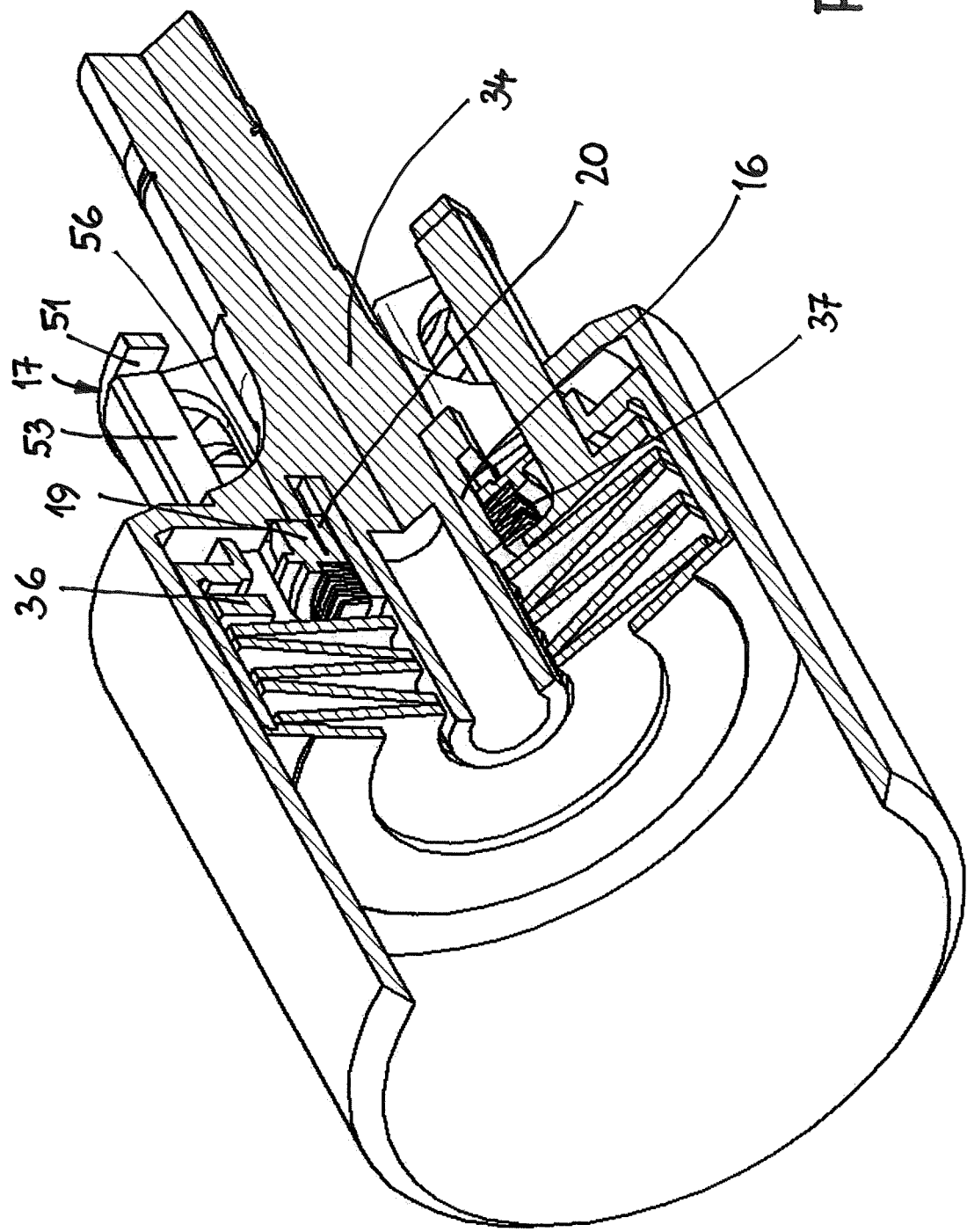
FIG. 26a shows in another perspective and partially sectioned illustration the locking unit when the disc pack coupling is closed.

The slanted end surfaces 23 of the cams 20 reach in this context a position in which they are substantially a continuation of the end faces 30 of the ribs 28 of the guide part 16 which are positioned at the same slant. Since the cams 19 have the end surfaces 21, 22 which are positioned at oppositely oriented slant relative to each other, the interaction of these slanted surfaces upon loading the locking part 15 by the pressure spring 37 causes the locking part 15 to rotate about its axis. In this context, the cams 19 reach the region of flat recesses 56 (FIGS. 12, 26, and 26a) which are provided between neighboring recesses 55 at the shaft section 34. Due to the end surfaces 21, 22 that are positioned at oppositely oriented slant relative to each other, the cams 19 under the force of the pressure spring 37 reach these flat recesses 56 which are matched in their shape to the end surfaces 21, 22 of the cams 19. In this way, the locking part 15 reaches the second axial position in which the locking part 15 is axially displaced relative to the guide part 16 in the direction toward the disc pack 6.

The cams 19 reach the recesses 56 when the sliding sleeve 17 and the piston element 52 are pressure-relieved. The coupling springs 7 can push back the sliding sleeve 17 and the piston element 52 in axial direction only so far until the pressure spring 37 is loaded to block, and the sliding sleeve 17 and the piston element 52 are thus held in working position such that the discs 3, 4 are held at the pressure which is required for torque transmission.

The drive 39 is switched off so that no energy is required in order to maintain the contact pressure on the discs 3, 4.

The pressure spring 37 is designed such that its stiffness is smaller than the stiffness of the coupling spring 7. In this way, it is ensured that the sliding sleeve 17 loads the coupling spring 7 sufficiently strongly in order to press the discs 3, 4 strongly against each other for torque transmission.

Of course, instead of the described drive 39 also another drive device can be employed with which the sliding sleeve 17 with the piston element 52 can be axially displaced in the described way relative to the guide part 16 in order to actuate the locking part 15.

When the disc pack coupling is to be opened again, the sliding sleeve 17 is displaced again by the drive 39 in such a way that the fingers 32 push the cams 20 out of the grooves 31 and the cams 19 are moved out of the recesses 56.

Then, as a result of the interacting slanted end surfaces 21 to 23, 30 of the cams 19, 20 of the locking part 15, of the ribs 28 of the guide part 16, and of the recesses 55, 56 it is achieved that the locking part 15 is rotated so far about its axis that the cams 19 move into the recesses 55 of the shaft section 34 (FIG. 11), wherein the pressure spring 37 effects pushing back the fingers 32 and thus also the sliding sleeve 17. The pressure chamber 41 is relieved in this context so that the annular piston 40 can be pushed back by the sliding sleeve 17.

The locking part 15 can be adjusted in the described way into two different axial positions wherein, for securing the axial positions, the guide part 16 as well as the shaft section 34 are employed. In the first axial position in which the disc pack coupling is open, the cams 19, 20 of the locking part 15 engage the grooves 31 of the guide part 16 and the recesses 55 of the shaft section 34. The other axial position which is assumed when the disc pack coupling is closed is determined in that the cams 19 of the locking part 15 engage the recesses 56 of the shaft section 34. These recesses 56 are significantly more flat than the recesses 55. In this second axial position, the locking part 15 maintains purely mechanically the pressure acting on the discs 3, 4 for the torque transmission. The drive 39 can be switched off so that a pressure medium supply for maintaining the contact pressure is no longer required when the disc pack coupling is closed.

FIGS. 1 through 5 show in schematic illustration further embodiment variants of disc pack couplings. Here, the locking part 15 only comprises the cams 20 which in both axial positions interact with the guide part 16 and are supported thereat.

In the embodiment variant according to FIG. 1, only the coupling spring 7 is provided with which the discs 3, 4 can be pressed against each other and which at the same time load the locking part 15 in the direction of its stop position. In the locked position of the locking part 15 in which the disc pack coupling is closed, the coupling spring 7 is pretensioned so strongly that the discs 3, 4 are contacting each other with sufficient force and can transmit the torque from the shaft 1 to the shaft 2.

With the aid of FIGS. 2a to 2e, the course of locking for an embodiment is described in which two springs are provided in accordance with the embodiment according to FIGS. 6 to 26. Moreover, the locking action is realized in a corresponding way also in the embodiment according to FIG. 1.

Figure 2A:
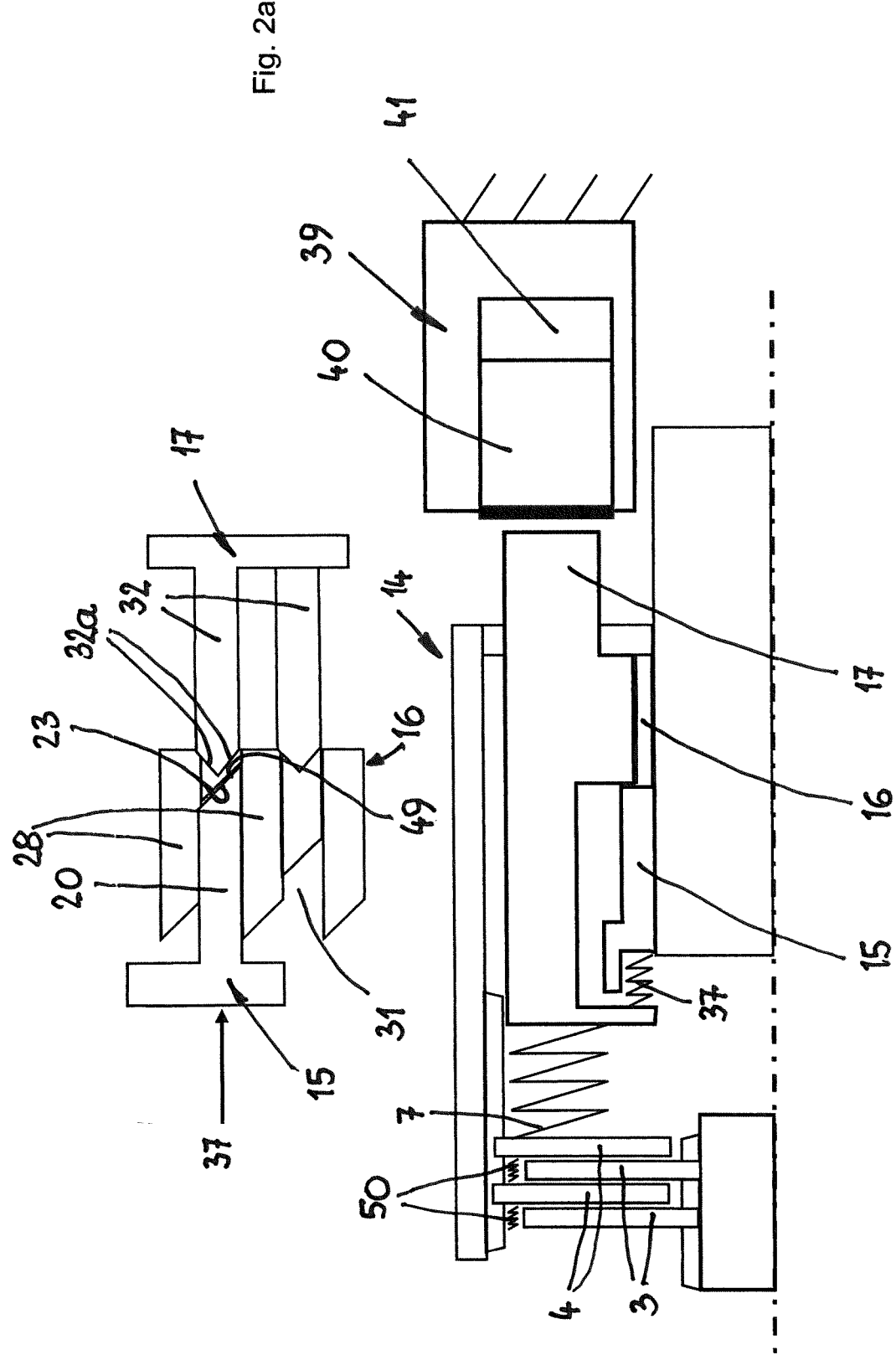

FIG. 2a shows the locking unit 14 in a position in which the disc pack coupling is open. The discs 3, 4 are positioned at a spacing away from each other so that no torque can be transmitted from the shaft 1 to the shaft 2.

As illustrated in FIG. 2a, the cams 20 of the locking part 15 engage in the described way the grooves 31 between the ribs 28 of the guide part 16. The axial position of the locking part 15 relative to the guide part 16 can be determined by corresponding stops 49 that are located in the respective groove 31. The sliding sleeve 17 is pulled back so far that its fingers 32 have a spacing relative to the cams 20 of the locking part 15.

The pressure chamber 41 of the drive 39 is not pressurized so that the annular piston 40 is displaced under the force of the coupling spring 7 via the sliding sleeve 17 into its initial position.

In order to synchronize the coupling (FIG. 2b), the sliding sleeve 17 is axially displaced relative to the guide part 16 by means of the drive 39. In this way, the coupling spring 7 is loaded such that the discs 3, 4 of the disc pack coupling are contacting each other. The fingers 32 of the sliding sleeve 17 engage the grooves 31 of the guide part 16 and push the cams 20 of the locking part 15 out of the grooves 31. Since the end faces 32a of the fingers 32 are designed in a pitched roof shape, one end face surface 32a' rests flat against the slanted end face 23 of the cams 20. Since the width of the fingers 32 corresponds to the width of the grooves 31, the sliding sleeve can be displaced properly in axial direction along the guide part 16.

As can be seen in FIG. 2c, the sliding sleeve 17 is displaced so far by means of the drive 39 that the fingers 32 of the sliding sleeve 17 have pushed the cams 20 of the locking part 15 completely out of the grooves 31 of the guide part 16. One end face surface 32a' of the fingers 32 forms in the end position of the sliding sleeve 17 approximately an extension of the slanted end face 30 of the ribs 28 of the guide part 16.

In the position according to FIG. 2c, the sliding sleeve 17 is under maximum actuating pressure of the drive 39. Due to the slanted surfaces 23, 30, 32a', which each have the same slant, the locking part 15 is rotated under the force of the pressure spring 37 slightly about its axis such that upon return movement of the sliding sleeve 17 the cams 20 move into a neighboring groove 31 of the guide part 16.

Figure 2D:
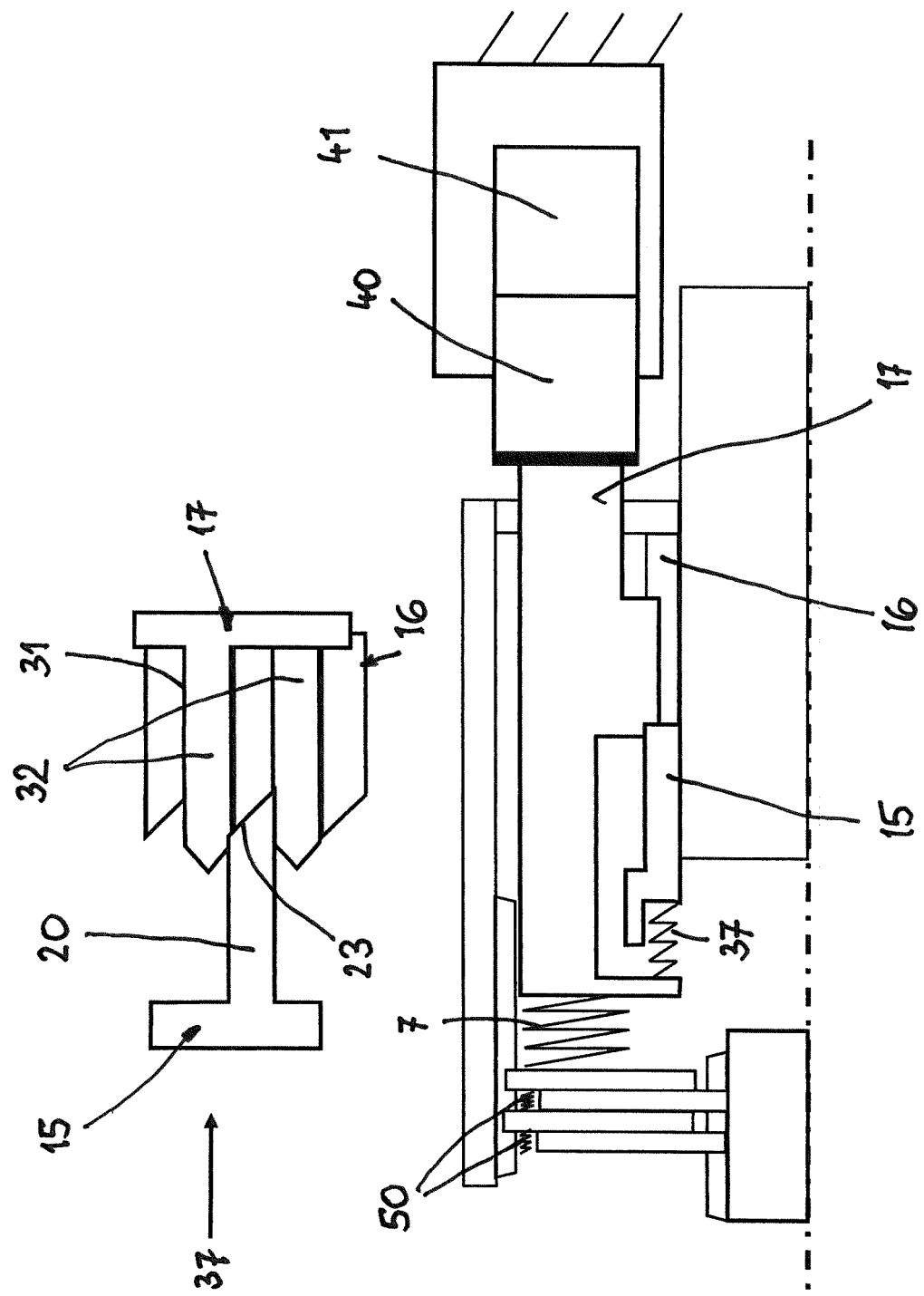

FIG. 2d shows the situation in which the locking part 15 has been rotated so far about its axis that the cams 20 are moved to the level of the neighboring groove 31 of the guide part 16 in circumferential direction. Since the sliding sleeve 17 with its fingers 32 is still positioned in the grooves 31 and projects from them, the locking part 15 can be rotated only so far about its axis until the cams 20 contact the neighboring fingers 32 of the sliding sleeve 17.

When subsequently the pressure chamber 41 is relieved, the sliding sleeve 17 is pushed back by the force of the coupling spring 7 such that its fingers 32 are pushed back in the grooves 31 of the guide part 16. Now the cams 20 of the locking part 15, under the force of the pressure spring 37, can move into the corresponding groove 31 of the guide part 16. This groove is axially significantly shorter than the corresponding neighboring groove 31 previously engaged by the cams 20. The shorter depth of the groove 31 is achieved by a correspondingly arranged stop 46 in the groove at which the cams 20 will come to rest (FIG. 2e). The stop 46 in the groove 31 has advantageously a slanted stop surface against which the cam 20 is resting with its slanted end face 23. The stop 49 has also advantageously a corresponding slanted stop surface. In the described way, deeper and not so deep grooves 31 are provided alternatingly along the circumference of the guide part 16.

The locking part 15 remains in its forwardly pushed position in the direction toward the disc pack coupling in which it locks the sliding sleeve 17 in its position that is also displaced. In this position of the sliding sleeve 17, the coupling spring 7 is loaded to a sufficient degree in order to keep the disc pack coupling 3, 4 closed. The pressure spring 37 is loaded to block.

In the described way, the disc pack coupling can also be opened again. In this case, the sliding sleeve 17 is again moved by means of the drive 39 such that the fingers 32 push the cams 20 of the locking part 15 out of the grooves 31 of the guide part 16. By means of the slanted end faces 23, 30, 32a' that are interacting which with each other, the locking part 15 is again rotated about its axis such that its cams 20 are moved into the respectively neighboring deeper grooves 31 of the guide part 16. Since these grooves are longer, the locking part 15 is pushed back under the force of the pressure spring 37 again into the position according to FIG. 2a. When the drive 39 is switched off, the sliding sleeve 17 is pushed back by the coupling spring 17 into the initial position according to FIG. 2. Since the coupling spring 7 in this context is relieved, the discs 3, 4 are no longer pressed sufficiently against each other by the coupling spring 7 so that a torque transmission from the shaft 1 to the shaft 2 no longer takes place.

Between the discs 3, 4, spreading springs 50 are provided which push apart the discs 3, 4 upon pressure relief.

FIG. 3 shows an embodiment in which the coupling spring 7 is pretensioned. In this way, the sliding sleeve 17 is pushed against a stop 43 which is provided at a housing part 44 which accommodates the coupling spring 7. As long as the drive 39 for the sliding sleeve 17 is inactive, the coupling spring 7 pushes the sliding sleeve 17 with a corresponding counter stop 45 against the stop 43.

The coupling spring 7 is designed such that it cannot press the discs 3, 4 against each other when the drive 39 is inactive.

The pressure spring 37 between the locking part 15 and the sliding sleeve 17 is also pretensioned.

FIG. 3a shows the situation when the disc pack coupling is open and no actuation pressure is existing. The pressure chamber 41 of the drive 39 is not pressurized wherein the sliding sleeve 17 with its counter stop 45 is contacting the stop 43 of the housing part 44 under the force of the pretensioned coupling spring 7. The cams 20 of the locking part 15 engage the deeper grooves 31 of the guide part 16. The sliding sleeve 17 is pushed back so far in axial direction that its fingers 32 are spaced apart from the cams 20 of the locking part 15 projecting into the grooves 31.

In order to close the disc pack coupling, first the air gap between the fingers 32 of the sliding sleeve 17 and the cams 20 of the locking part 15 is closed (FIG. 3b). For this purpose, the annular piston 40 of the drive 39 is subjected to pressure so that the sliding sleeve 17 is displaced accordingly. The counter stop 45 of the sliding sleeve 17 moves away from the stop 43 of the housing part 44.

As soon as the air gap is closed, the fingers 32 of the sliding sleeve 17 with their end face sections 32a' rest flat against the slanted end face 23 of the cams 20 of the locking part 15.

Since the sliding sleeve 17 in this context is axially displaced, the coupling spring 7 presses the discs 3, 4 against each other.

Upon further pressure increase, the synchronization of the coupling takes place in that the sliding sleeve 17 is displaced farther in axial direction toward the locking part 15 (FIG. 3c).

FIG. 3d shows the situation that the disc pack coupling is synchronized and the maximum actuation pressure is acting on the sliding sleeve 17. The pressure chamber 41 is subjected to maximum pressure so that the annular piston 40 maximally displaces the sliding sleeve 17 against the force of the coupling spring 7.

The fingers 32 of the sliding sleeve 17 force the cams 20 of the locking part 15 out of the grooves 31 of the guide part 16 in that the fingers 32 of the sliding sleeve 17 project slightly past the ribs 28 of the guide part 16. The locking part 15 is displaced in this context against the force of the pressure spring 37 which thus axially loads the locking part 15 in the direction of its initial position. At the maximum actuation pressure, the slanted end surface 23 of the cams 20 of the locking part 15 is positioned slightly in front of the slanted end faces 30 of the ribs 28 of the guide part 16.

Since the cams 20 with their slanted end surfaces 23 are contacting the corresponding slanted end face sections 32a' of the fingers 32 of the sliding sleeve 17 and the locking part 15 is loaded by the pressure spring 37 axially toward the sliding sleeve 17, the locking part 15 by interaction of the slanted surfaces is rotated about its axis such that the cams 20 move into the region of the neighboring grooves 31 of the guide part 16 that have a reduced depth.

Figure 3E:
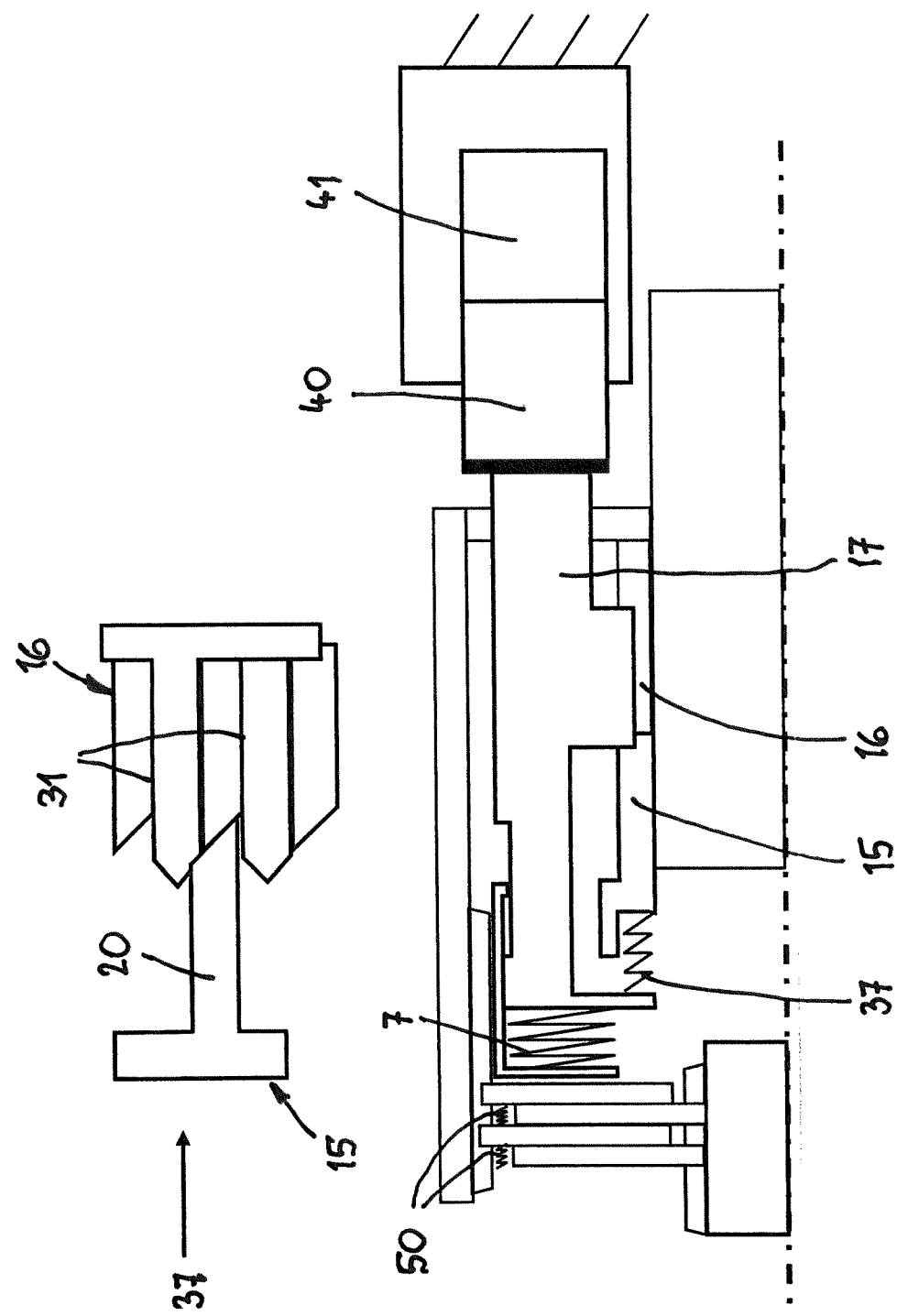

This situation is illustrated in FIG. 3e. The locking part 15 has been rotated so far about its axis that the cams 20 are positioned at the level of the neighboring grooves 31 of the guide part 16.

Figure 3F:
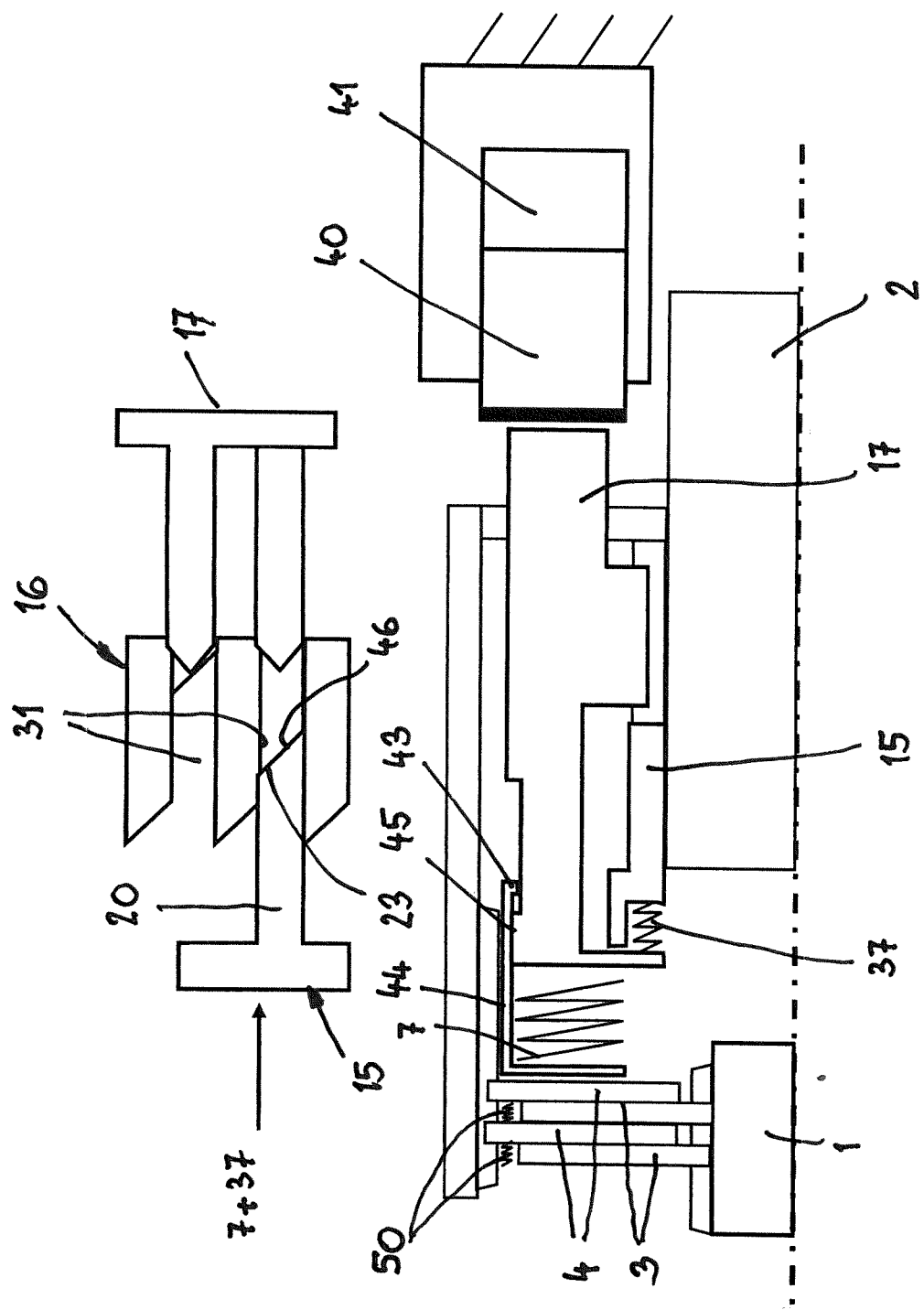

Now the pressure chamber 41 is depressurized (FIG. 3f). This results in the sliding sleeve 17 being pushed back by the pretensioned coupling spring 7. In this context, the piston 40 is also returned. By means of the pressure spring 37, the sliding sleeve 17 displaces also the locking part 15 axially. In this context, the cams 20 of the locking part 15 move into the grooves 31 with the smaller depth. The slanted end surface 23 of the cams 20 come to rest against the corresponding stops 46 in these grooves 31. The thus blocked locking part 15 serves as a stop for the sliding sleeve 17 so that the latter cannot be pushed back into its initial position by the coupling spring 7. As shown in FIG. 3*f*, the counter stop 45 of the sliding sleeve 17 has an axial spacing from the stop 43 of the housing part 44. In this stop-limited position of the sliding sleeve 17, the coupling spring 7 is pretensioned such that it can press the discs 3, 4 sufficiently strongly against each other in order to transmit the torque from the shaft 1 to the shaft 2. The pressure spring 37 is tensioned to block in this locked position.

For releasing the disc pack coupling, the sliding sleeve 17 is pushed again against the locking part 15 by loading the piston 40 with pressure wherein the fingers 32 of the sliding sleeve 17 push the cams 20 in the described way out of the grooves 31 of the guide part 16. Due to the slanted surfaces resting against each other and the axial load, the locking part 15 is again rotated about its axis such that the cams 20 are moved to the level of the neighboring longer grooves 31 of the guide part 16. The drive 39 is subsequently switched off so that the coupling spring 7 can push back the sliding sleeve 17 again into the initial position according to FIGS. 3 and 3*a*. The cams of the locking part 15 are pushed back into the longer grooves 31 so that the locking part 15 is moved into its initial position according to FIGS. 3 and 3*a*. The discs 3, 4 in this initial position are pushed apart by the spreading springs 50 and the coupling is released in this way.

FIG. 4 shows in schematic illustration an embodiment variant in which, in addition to the coupling spring 7 and the pressure spring 37, an additional pressure spring 47 is provided. The pressure spring 37 is provided such that it has a smaller spring stiffness than the coupling spring 7 and the pressure spring 47.

The coupling spring 7 and the pressure spring 47 are separated from each other by a pressure plate 48 which can be displaced along the coupling basket 5. By means of the pressure plate 48, the discs 3, 4 are pressed against each other.

By means of the pressure spring 47, the sliding sleeve is acting on the pressure plate 48.

FIG. 4*a* shows the coupling in the open state. The discs 3, 4 have a spacing to each other. The cams 20 of the locking part 15 engage the longer grooves 13 of the guide part 16. The sliding sleeve 17 is pushed back so far that its fingers 32 have a spacing from the cams 20.

For synchronization of the coupling, the sliding sleeve 17 is axially displaced by means of the drive 39 in the described way. In doing so, the fingers 32 move into the grooves 31 of the guide part 16 and displace the cams 20 of the locking part 15. By displacement of the sliding sleeve 17, the pressure spring 47 is loaded which displaces the pressure plate 48 against the force of the coupling spring 7. With it, the discs 3, 4 are axially pressed against each other.

Figure 4B:
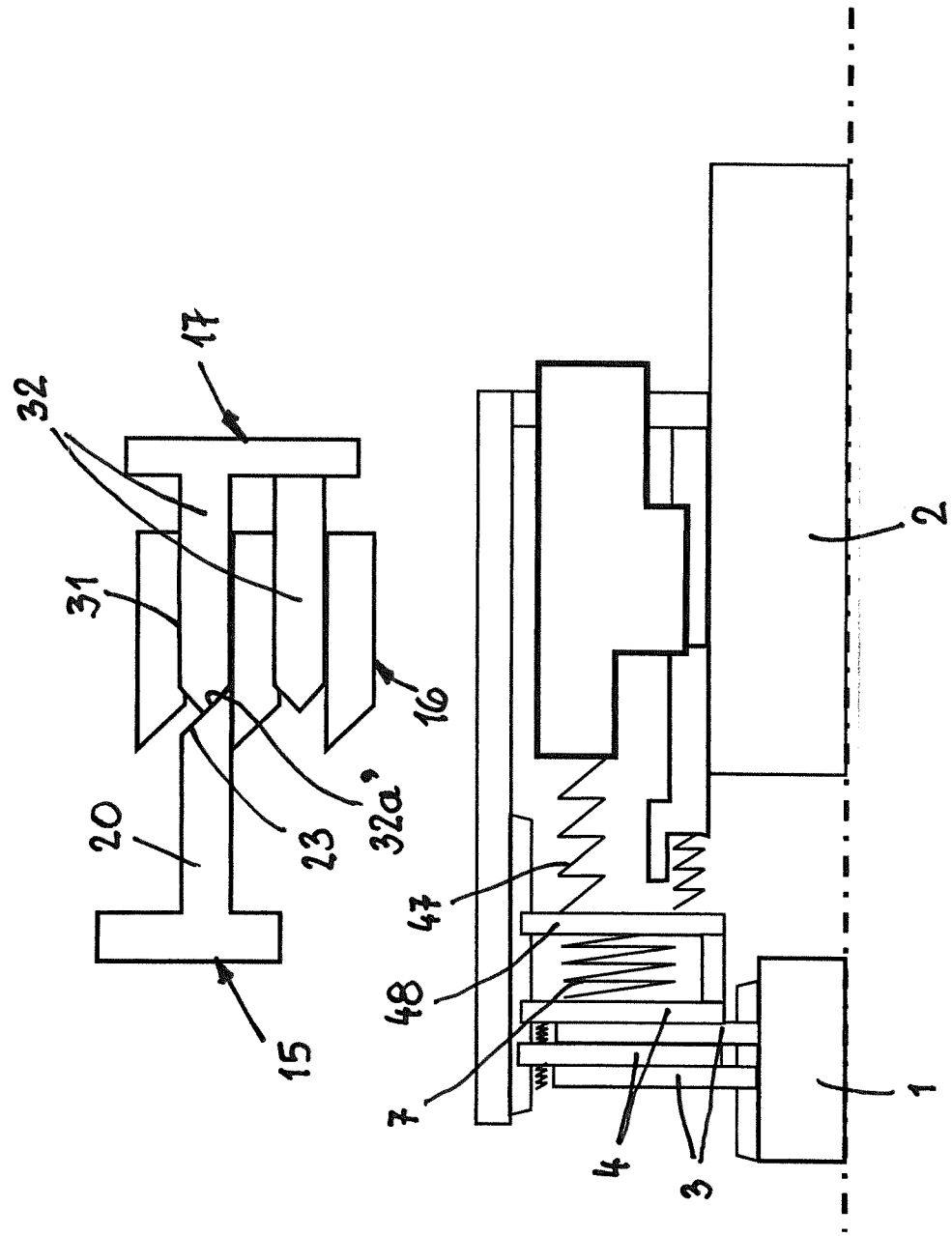

As is disclosed in FIG. 4*b*, the locking part 15 during synchronization of the coupling is displaced so far by the sliding sleeve 17 that the cams 20 are not yet pushed completely out of the groove 31 of the guide part 16. The slanted end surface 23 of the cams 20 is resting against the slanted end surface section 32*a'* of the fingers 32 of the sliding sleeve 17.

As described with the aid of the preceding embodiments, the piston 40 is subjected to maximum pressure so that the sliding sleeve 17 is displaced so far that its fingers 32 push the cams 20 of the locking part 15 completely out of the grooves 31 of the guide part 16. In this position (FIG. 4*c*), the end face sections 32*a'* of the fingers 32 project past the slanted end face 30 of the respectively neighboring rib 28 of the guide part 16. By means of this over-extending process, the cams 20 reliably are freed from the grooves 31 of the guide part 16. Since the locking part 15 is loaded by the pressure spring 37 which is axially supported at the pressure plate 48, the locking part 15 due to the slanted end faces 23, 32*a'* resting against each other is rotated so far about its axis that the cams 20 are moved into the region of the neighboring grooves 31 of the guide part 16 which are of reduced depth.

At the level of the grooves 31 of reduced depth, the cams 20 of the locking part 15 come into contact in the described manner with the fingers 32 of the sliding sleeve 17 which are positioned in the grooves 31. Corresponding to the preceding embodiments, the locking part 15 is then aligned axially relative to the guide part 16 so that now the annular piston 40 can be relieved. This has the result that the sliding sleeve 17 is pushed back under the force of the pressure spring 47. At the same time, the cams 20 of the locking part 15 can be moved under the force of the pressure spring 37 into the grooves 31 of the guide part 16 of reduced depth until the cams 20 contact the stops 46 in these grooves 31.

In this locked position, the locking part 15 supports the pressure plate 48 (FIG. 4*d*) which under the force of the coupling spring 7 is resting against the locking part 15. In this stop position, the force of the coupling spring 7 is so high that the disc pack coupling is closed and the torque can be transmitted from the shaft 1 to the shaft 2.

In the stop position, the sliding sleeve 17 is retracted so far that its fingers 32 are spaced apart from the cams 20 of the locking part 15.

When the coupling is to be opened again, the sliding sleeve 17 is displaced by the drive 39 in the direction toward the locking part 15 until the fingers 32 push the cams 20 out of the grooves 31 of the guide part 16 of reduced depth until the position corresponding to FIG. 4*c* is reached. Under the force of the pressure spring 37, the locking part 15 is then rotated, due to the slanted end surfaces 23, 32*a'* that are resting against each other, about its longitudinal axis until the cams 20 contact the neighboring fingers 32 of the sliding sleeve 17 projecting past the neighboring grooves. When now the sliding sleeve 17 is pushed back in the described manner by pressure relief, the cams 20 of the locking part 15 are displaced by the spring 37 into the deeper grooves 31 of the guide part 16 until the position according to FIG. 4*a* is reached.

The coupling spring 7 can then displace the pressure plate 48 so far along the coupling basket 5 until the discs 3, 4 lift off each other again under the force of the spreading springs 50.

In the embodiments according to FIGS. 1 through 5, the deep and the flat grooves 31 of the guide part 16 are arranged alternatingly one behind the other. The cams 20 of the locking part 15 are provided such that, depending on the rotational position of the locking part 15, they engage only the deep or only the flat grooves 31. In this way, the locking part 15 alternately reaches one or the other axial position. The sliding sleeve 17 has a number of fingers 32 corresponding to the number of grooves 31 so that for each adjusting process the cams 20 are pushed out of the respective grooves 31.

The locking units 14 of the described embodiments ensure that the contact pressure which is acting on the discs 3, 4 for transmitting the torque can be maintained without generating a permanent actuating pressure in that the locking part 15 acts as a stop with which the required contact pressure on the discs can be maintained. The sufficient contact pressure is generated in the locked state without energy demand wherein a maximum defined torque can be transmitted reliably.

The locking unit 14 is characterized by a simple and robust construction. Only the locking part 15, the guide part 16, and the sliding sleeve 17 as well as at least one pressure spring are required. Locking of the locking part 15 for maintaining the contact pressure on the discs 3, 4 is realized by means of a form fit engagement of the cams 19, 20 of the locking part 15 in the corresponding recesses 56 of the shaft section 34 (FIGS. 6 to 26) or in the grooves 31 of the guide part 16 with reduced depth.

The at least one pressure spring can compensate geometric tolerances of the three components of the locking unit 14 as well as wear of the discs 3, 4 so that the contact pressure is always maintained in a permissible range for the torque transmission.

The specification incorporates by reference the entire disclosure of German priority document 10 2019 002 212.2 having a filing date of Mar. 25, 2019.

While specific embodiments of the invention have been shown and described in detail to illustrate the inventive principles, it will be understood that the invention may be embodied otherwise without departing from such principles.

What is claimed is:

1. A disc pack coupling for torque transmission between a first shaft and a second shaft, the disc pack coupling comprising:
   coupling discs;
   a locking unit configured to maintain a contact pressure acting on the coupling discs when the disc pack coupling is closed, wherein the locking unit comprises at least one locking part, at least one guide part, at least one actuating element, and at least one pressure element, wherein the at least one pressure element applies the contact pressure;
   wherein the at least one guide part is non-rotatably and non-displaceably arranged in relation to the first shaft;
   wherein the at least one locking part comprises a locking part axis and is rotatable about the locking part axis and displaceable in an axial direction of the locking part axis;
   wherein the at least one locking part and the at least one guide part comprise control surfaces interacting with each other and positioned at a slant in relation to a rotational direction of the at least one locking part;
   wherein the at least one actuating element is configured to act on the at least one locking part to axially move the at least one locking part;
   wherein, when the at least one locking part is acted on and axially moved by the at least one actuating element, the control surfaces are configured to move the at least one locking part into a first stop position, in which the at least one locking part is locked at the least one guide part, and into a second stop position, in which the at least one locking part is locked at the at least one guide part;
   wherein the at least one locking part, in the first stop position, maintains the contact pressure acting through the at least one pressure element on the coupling discs, and wherein the at least one locking part, in the second stop position, causes the contact pressure acting through the at least one pressure element on the coupling discs to be released.

2. The disc pack coupling according to claim 1, wherein the at least one locking part is supported on the first shaft and surrounds the first shaft, wherein the at least one locking part is axially displaceable along the first shaft and rotatable about the first shaft.

3. The disc pack coupling according to claim 1, wherein the at least one locking part comprises axially extending cams configured to engage axially extending grooves of the at least one guide part.

4. The disc pack coupling according to claim 3, wherein the axially extending grooves are delimited by ribs projecting away from an outer side of the at least one guide part.

5. The disc pack coupling according to claim 3, wherein the at least one guide part surrounds the first shaft.

6. The disc pack coupling according to claim 3, wherein the axially extending grooves are open at both axial ends thereof.

7. The disc pack coupling according to claim 3, wherein stops interacting with the axially extending cams of the at least locking part are provided in the axially extending grooves of the at least one guide part.

8. The disc pack coupling according to claim 7, wherein the stops determine the first and second stop positions for the at least one locking part.

9. The disc pack coupling according to claim 7, wherein the stops are provided at different depths in the axially extending grooves of the at least one guide part.

10. The disc pack coupling according to claim 3, wherein the at least one actuating element is supported so as to be axially displaceable relative to the first shaft and comprises fingers configured to be moved into the axially extending grooves of the at least one guide part.

11. The disc pack coupling according to claim 10, wherein the axially extending grooves are delimited by ribs projecting away from an outer side of the at least one guide part, wherein the control surfaces are formed by end faces of the ribs of the at least one guide part and by end faces of the axially extending cams of the at least one locking part.

12. The disc pack coupling according to claim 11, wherein, for adjusting the at least one locking part into the first and second stop positions, the fingers of the at least one actuating element are configured to push the axially extending cams of the at least one locking part so far out of the axially extending grooves of the at least one guide part that the end faces of the ribs of the at least one guide part and slanted end faces of the fingers of the at least one actuating element are positioned approximately aligned with each other, wherein the end faces of the axially extending cams are slanted end faces, and wherein, by contact of the slanted end faces of the axially extending cams at the slanted end faces of the fingers of the at least one actuating element, the at least one locking part is rotatable about the locking part axis as a result of an axial pressure loading.

13. A disc pack coupling for torque transmission between a first shaft and a second shaft, the disc pack coupling comprising:
   coupling discs;
   a locking unit configured to maintain a contact pressure acting on the coupling discs when the disc pack coupling is closed, wherein the locking unit comprises at least one locking part, at least one guide part, at least one actuating element, and at least one pressure element, wherein the at least one pressure element applies the contact pressure;

wherein the at least one guide part is non-rotatably and non-displaceably arranged in relation to the first shaft;

wherein the at least one locking part comprises a locking part axis and is rotatable about the locking part axis and displaceable in an axial direction of the locking part axis;

wherein the at least one locking part and the at least one guide part comprise control surfaces interacting with each other and positioned at a slant in relation to a rotational direction of the at least one locking part;

wherein the at least one actuating element is configured to act on the at least one locking part to axially move the at least one locking part;

wherein, when the at least one locking part is acted on and axially moved by the at least one actuating element, the control surfaces are configured to move the at least one locking part into a first stop position, in which the at least one locking part is locked at first recesses of the first shaft, and into a second stop position, in which the at least one locking part is locked at second recesses of the first shaft;

wherein the at least one locking part, in the first stop position, maintains the contact pressure acting through the at least one pressure element on the coupling discs, and wherein the at least one locking part, in the second stop position, causes the contact pressure acting through the at least one pressure element on the coupling discs to be released.

14. The disc pack coupling according to claim 13, wherein the at least one locking part comprises first cams configured to engage in the first recesses provided at the first shaft and further comprises second cams configured to engage in the second recesses provided at the first shaft.

15. The disc pack coupling according to claim 14, wherein the first recesses and the second recesses of the first shaft have different axial depths in an axial direction of the first shaft.

16. The disc pack coupling according to claim 13, wherein the at least one locking part is supported on the first shaft and surrounds the first shaft, wherein the at least one locking part is axially displaceable along the first shaft and rotatable about the first shaft.

17. The disc pack coupling according to claim 13, wherein the at least one locking part comprises axially extending cams configured to engage axially extending grooves of the at least one guide part.

18. The disc pack coupling according to claim 17, wherein the axially extending grooves are delimited by ribs projecting away from an outer side of the at least one guide part.

19. The disc pack coupling according to claim 17, wherein the at least one guide part surrounds the first shaft.

20. The disc pack coupling according to claim 17, wherein the axially extending grooves are open at both axial ends thereof.

21. The disc pack coupling according to claim 17, wherein the at least one actuating element is supported so as to be axially displaceable relative to the first shaft and comprises fingers configured to be moved into the axially extending grooves of the at least one guide part.

22. The disc pack coupling according to claim 21, wherein the axially extending grooves are delimited by ribs projecting away from an outer side of the at least one guide part, wherein the control surfaces are formed by end faces of the ribs of the at least one guide part and by end faces of the axially extending cams of the at least one locking part.

* * * * *